(12) United States Patent
McElderry

(10) Patent No.: US 9,417,509 B2
(45) Date of Patent: Aug. 16, 2016

(54) UNIVERSAL STABILIZING CAMERA MOUNT APPARATUS

(71) Applicant: CAM CADDIE, Glendale, CA (US)

(72) Inventor: Daniel McElderry, Glendale, CA (US)

(73) Assignee: CAM CADDIE, Glendale, CA (US)

( * ) Notice: Subject to any disclaimer, the term of this patent is extended or adjusted under 35 U.S.C. 154(b) by 0 days.

(21) Appl. No.: 14/777,133

(22) PCT Filed: Mar. 15, 2014

(86) PCT No.: PCT/US2014/030062
§ 371 (c)(1),
(2) Date: Sep. 15, 2015

(87) PCT Pub. No.: WO2014/145323
PCT Pub. Date: Sep. 18, 2014

(65) Prior Publication Data
US 2016/0026072 A1    Jan. 28, 2016

Related U.S. Application Data

(60) Provisional application No. 61/800,421, filed on Mar. 15, 2013.

(51) Int. Cl.
| | |
|---|---|
| *G03B 17/56* | (2006.01) |
| *F16M 11/00* | (2006.01) |
| *F16M 13/00* | (2006.01) |
| *F16M 11/04* | (2006.01) |
| *F16M 11/38* | (2006.01) |
| *F16M 11/40* | (2006.01) |
| *F16M 11/42* | (2006.01) |
| *F16M 13/04* | (2006.01) |
| *F16M 11/16* | (2006.01) |
| *F16M 11/24* | (2006.01) |

(52) U.S. Cl.
CPC ........... *G03B 17/561* (2013.01); *F16M 11/043* (2013.01); *F16M 11/16* (2013.01); *F16M 11/242* (2013.01); *F16M 11/38* (2013.01); *F16M 11/40* (2013.01); *F16M 11/42* (2013.01); *F16M 13/00* (2013.01); *F16M 13/04* (2013.01); *G03B 17/563* (2013.01)

(58) Field of Classification Search
CPC .......................... G03B 17/561; G03B 17/563
See application file for complete search history.

(56) References Cited

U.S. PATENT DOCUMENTS

| | | |
|---|---|---|
| 3,333,519 A | 8/1967 | Padelt |
| 4,158,489 A | 6/1979 | Gottschalk et al. |

(Continued)

*Primary Examiner* — William Perkey
(74) *Attorney, Agent, or Firm* — Cotman IP Law Group, PLC

(57) ABSTRACT

The present disclosure describes a multi-functional device for mounting a camera or video camera and methods of using the same. The device comprises a base unit and one or more accessories. In preferred embodiments, the base unit may comprise mounting channels and an attachment accessory may be secured to the base unit using a quick-release attachment. In preferred embodiments, the accessories may comprise one or more accessories from the group consisting of a main handle assembly, adjustable feet, a tripod mount, a gimbal stabilization assembly, a dolly assembly, interlocking articulating feet, and a shoulder support assembly.

20 Claims, 40 Drawing Sheets

(56) References Cited

U.S. PATENT DOCUMENTS

| | | | | |
|---|---|---|---|---|
| 8,534,934 B1* | 9/2013 | Carney | ................... | F16M 11/02 248/178.1 |
| 8,721,199 B1* | 5/2014 | Hart | ..................... | F16M 11/045 396/428 |
| 2007/0095246 A1 | 5/2007 | Heiligenmann | | |
| 2007/0154254 A1 | 7/2007 | Bevirt | | |
| 2011/0188847 A1 | 8/2011 | McKay | | |
| 2015/0288858 A1* | 10/2015 | Fee | ........................ | F16M 13/04 348/376 |
| 2015/0362122 A1* | 12/2015 | Brown | ................. | F16M 11/041 348/208.2 |
| 2016/0026072 A1* | 1/2016 | McElderry | ........... | G03B 17/561 396/420 |
| 2016/0041454 A1* | 2/2016 | McElderry | ........... | G03B 17/566 396/428 |

* cited by examiner

UNIVERSAL STABILIZING CAMERA MOUNT APPARATUS

CROSS-REFERENCE TO RELATED APPLICATIONS

This application claims priority to U.S. Provisional Patent Appl. No. 61/800,421, filed on Mar. 15, 2013, the disclosure of which is incorporated herein in its entirety by reference.

BACKGROUND

1. Field of the Invention

The present disclosure relates to devices for mounting a camera or video camera and methods of using the same.

2. Description of the Related Art

Digital cameras were first invented nearly forty years ago, and have eventually become the dominant technology in consumer photography.[1] In addition to stand-alone devices such as compact digital cameras and digital single lens reflex (DSLR) cameras, digital cameras have now become commonplace as integrated elements of portable electronic devices such as cellular phones, smart phones, and tablets. Both stand-alone digital cameras and integrated digital cameras are now capable of recording videos as well. Stand-alone cameras have a well-developed array of accessories for use therewith, such as electronic flash units, constant lighting sources, microphones and other recording devices, and tripods and other mounting devices. By contrast, integrated digital cameras on portable electronic devices do not have a similar array of available accessories for use therewith.

[1] http://en.wikipedia.org/wiki/digital_camera

Integrated digital cameras on portable electronic devices such as cellular phones, smart phones, and tablets are useful in part because of the multi-functionality and portability of these devices. Thus, when in possession of such a device an individual does not have to have a stand-alone camera available whenever an occasion or opportunity for photography or videography arises. However, this also limits the utility of integrated digital cameras, as the user does not have access to accessories that can enhance the user's photography or videography like those available for stand-alone cameras. While the quality of photographs and videos generated using integrated digital cameras is rapidly increasing, the lack of available accessories still limits the use of such cameras to certain types of situations. The unavailability of accessories for mounting integrated digital cameras limits the use and effectiveness of such cameras in capturing many types of images and video recordings.

In addition, accessories used to mount stand-alone digital cameras are designed for a single type of use. Thus a separate mounting accessory is required for each type of use.

Thus there remains a need for a multi-functional device that enables users to mount or otherwise secure stand-alone and integrated digital cameras, video cameras, and other photo- or video-enabled devices while taking photographs and generating video recordings.

SUMMARY

The present disclosure describes a multi-functional device for mounting a camera or video camera and methods of using the same. The device comprises a base unit and one or more accessories. In preferred embodiments, the base unit may comprise mounting channels and an attachment accessory may be secured to the base unit using a quick-release attachment. In preferred embodiments, the accessories may comprise one or more accessories from the group consisting of a main handle assembly, adjustable feet, a tripod mount, a gimbal stabilization assembly, a dolly assembly, interlocking articulating feet, and a shoulder support assembly.

DETAILED DESCRIPTION OF THE PREFERRED EMBODIMENTS

The present disclosure describes a multi-functional device for mounting a camera and methods of using the same. The device comprises a base unit and one or more removable mounting accessories that interface with the base unit. In preferred embodiments, the mounting accessories are adjustable to accommodate a variety of camera designs.

In preferred embodiments, the device operates as a universal handle and photo/video accessory platform that allows a user to hold, maneuver, and stabilize a stand-alone digital camera, integrated digital camera, video camera, or any other photo- and video-enabled device in a variety of different ways. In highly preferred embodiments, the mounting accessories are attached to and detached from the base unit using quick-release attachments.

Figure 1:
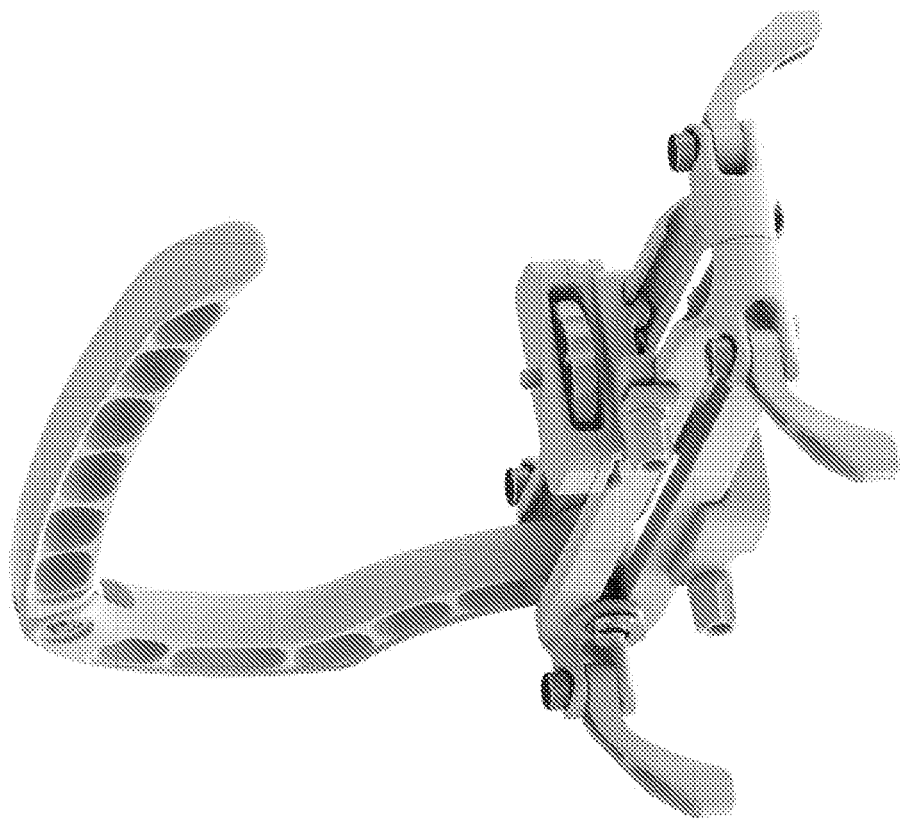
FIG. 1 is a front perspective and shaded view of the camera mounting device with various preferred accessories attached.
Figure 2:
FIG. 2 is a rear perspective and shaded view of the camera mounting device with various preferred accessories attached.
Figure 3:
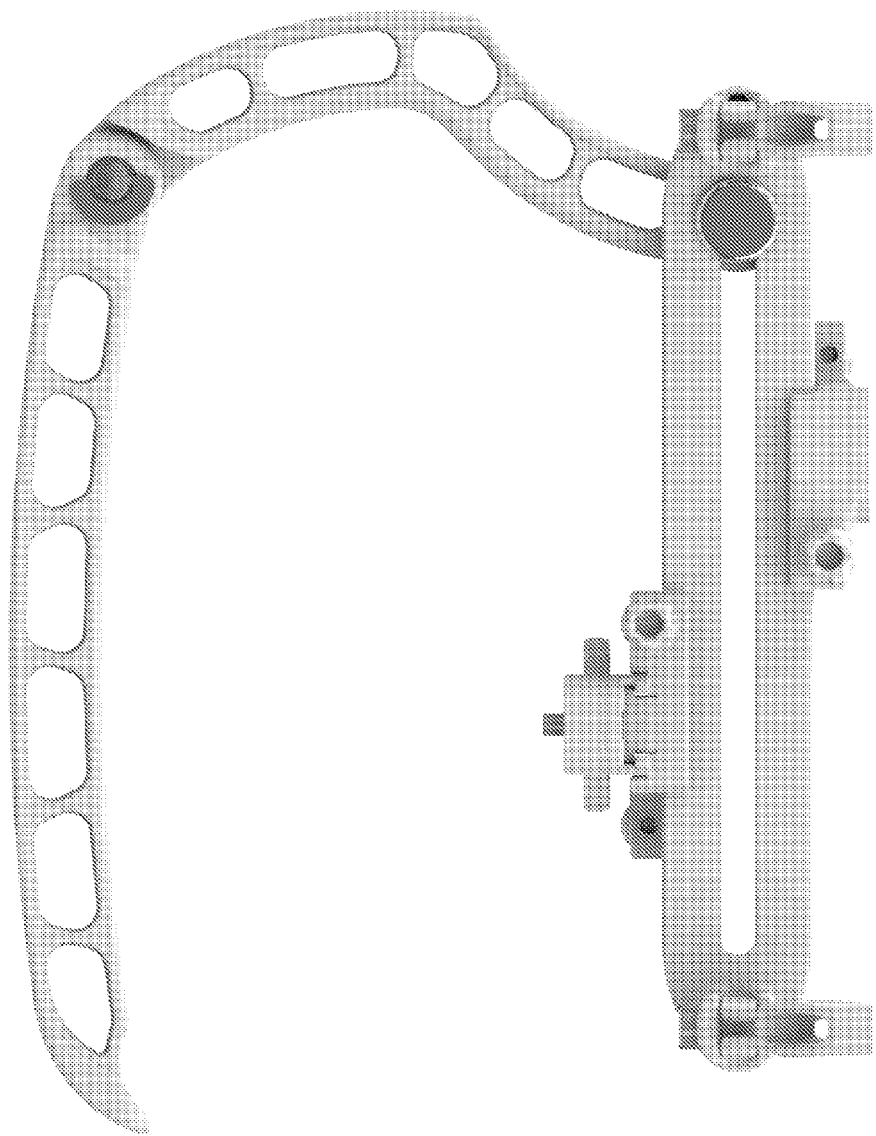
FIG. 3 is a side elevational and shaded view of the camera mounting device with various preferred accessories attached.

In preferred embodiments, the base unit comprises one or more mounting channels and mounting accessories are attached to the base unit via the mounting channels, as shown in FIGS. 1-3. In highly preferred embodiments, the camera or video camera is attached directly to the base unit, creating a central platform around which various mounting accessories may be readily assembled and disassembled. In such embodiments, the camera or video camera may be attached to the device via a camera mount thumb wheel and may be secured in place via a base unit X-Y table and a T-channel clamp. This allows a user to adjust his or her setup without having to completely disassemble one camera accessory platform and then reassemble the camera to connect it to a new accessory platform. The camera remains attached to the base unit while the accessories surrounding it may be readily changed. A user can thus work fluidly without significant interruptions to change accessories, thereby drastically reducing preparation time during filming. The device provides the user with many different possible configurations that would otherwise not be possible to achieve using a single device.

Figure 4:
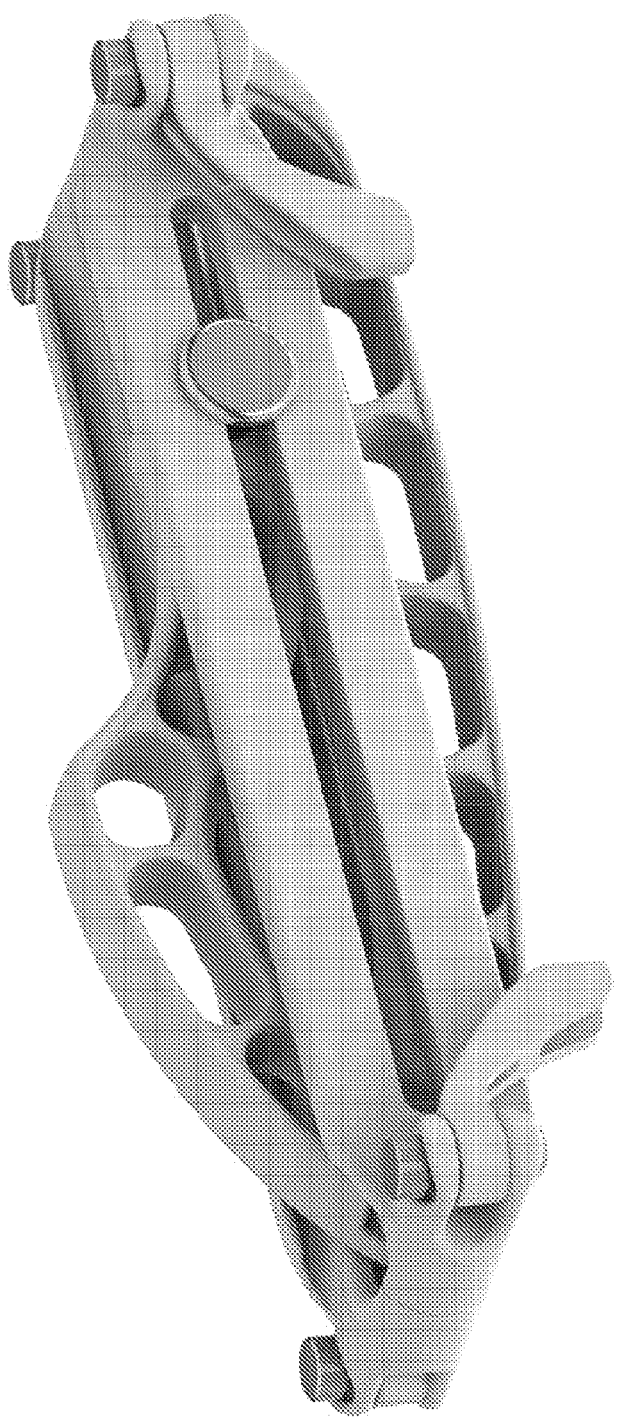
FIG. 4 is a perspective and shaded view of a collapsed configuration of the camera mounting device.
Figure 5:
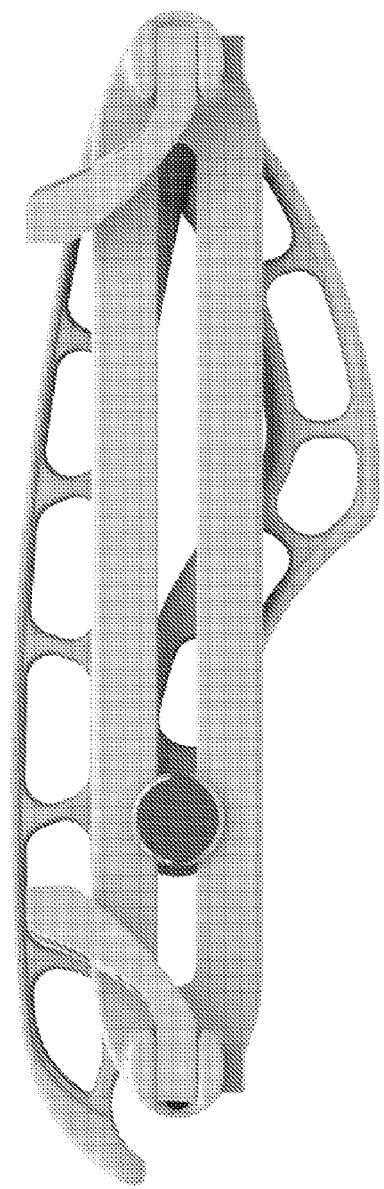
FIG. 5 is a side elevational and shaded view of a collapsed configuration of the camera mounting device.

In preferred embodiments, the accessories comprise a main handle assembly that attaches to the base unit via a rotatable joint that can rotate 360 degrees. The main handle assembly may be used as a top handle and is adjustable to accommodate different sized cameras. The main handle assembly may also be used as an interface for other accessories. For example, the main handle assembly may be used as a counterweight mount for the device when used in the gimbal stabilized assembly described below. The main handle assembly may also be used in a variety of ways to hold and maneuver the device. In preferred embodiments, the main handle assembly may also be folded into the base unit to compact the device for ease of transportation, as shown in FIGS. 4-5.

In preferred embodiments, the main handle assembly comprises holes. The holes may be used by the user to insert fingers into the main handle assembly to permit greater control of the device while in use. The holes may also be used as a mounting interface for other accessories.

Figure 6:
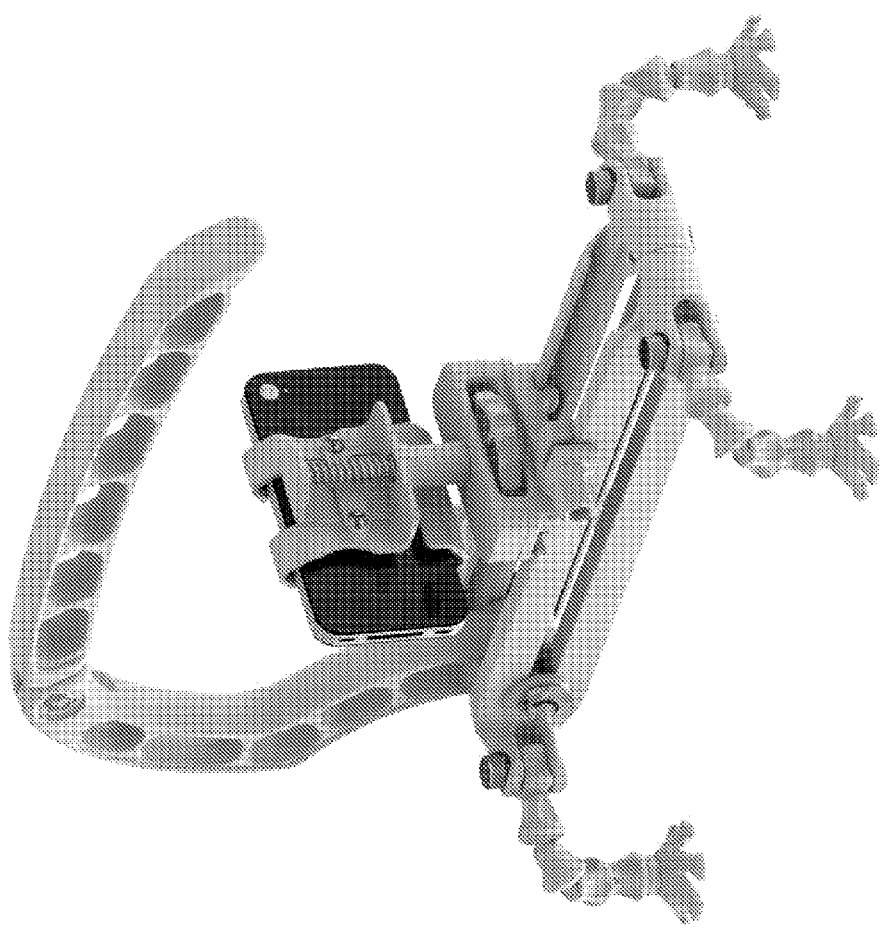
FIG. 6 is a front perspective and shaded view of the camera mounting device with various preferred accessories attached while securing a smart phone integrated digital camera.
Figure 7:
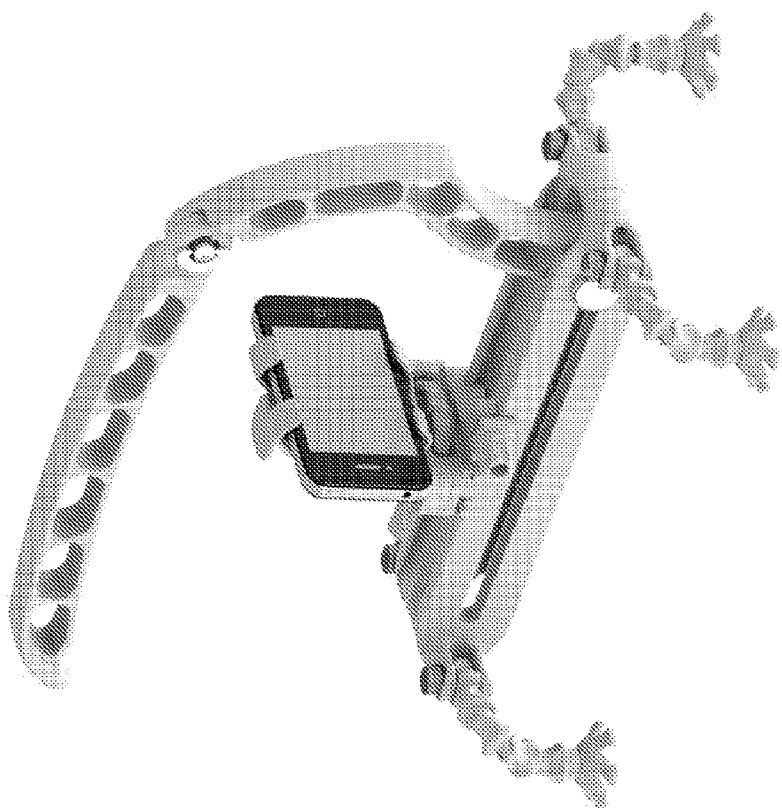
FIG. 7 is a rear perspective and shaded view of the camera mounting device with various preferred accessories attached while securing a smart phone integrated digital camera.

In preferred embodiments, the accessories may comprise adjustable feet to stabilize the device on a flat surface, as shown in FIGS. 6-7.

Figure 8:
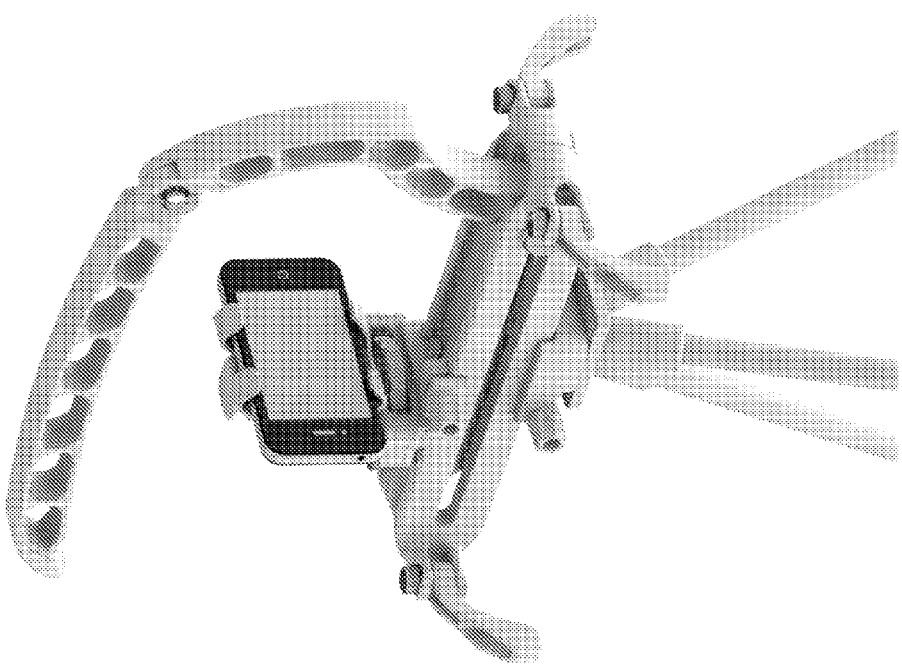
FIG. 8 is a rear perspective and shaded view of the camera mounting device mounted on a tripod with various preferred accessories attached while securing a smart phone integrated digital camera.
Figure 9:
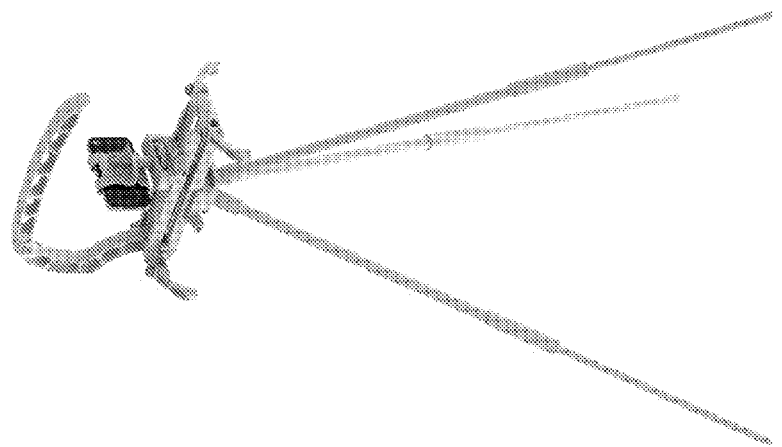
FIG. 9 is a front perspective and shaded view of the camera mounting device mounted on a tripod with various preferred accessories attached while securing a smart phone integrated digital camera.
Figure 10:
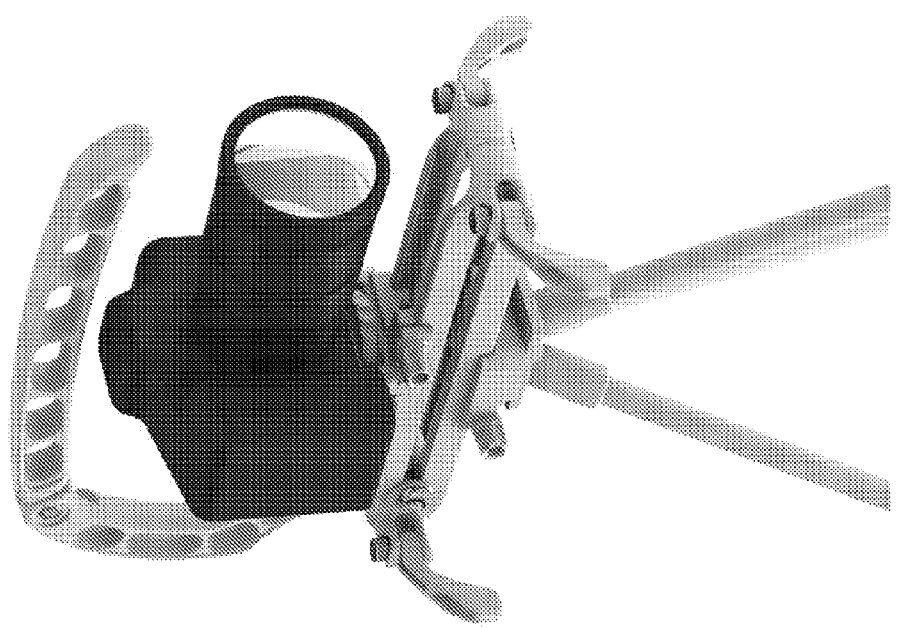
FIG. 10 is a front perspective and shaded view of the camera mounting device mounted on a tripod with various preferred accessories attached while securing a DSLR camera.
Figure 11:
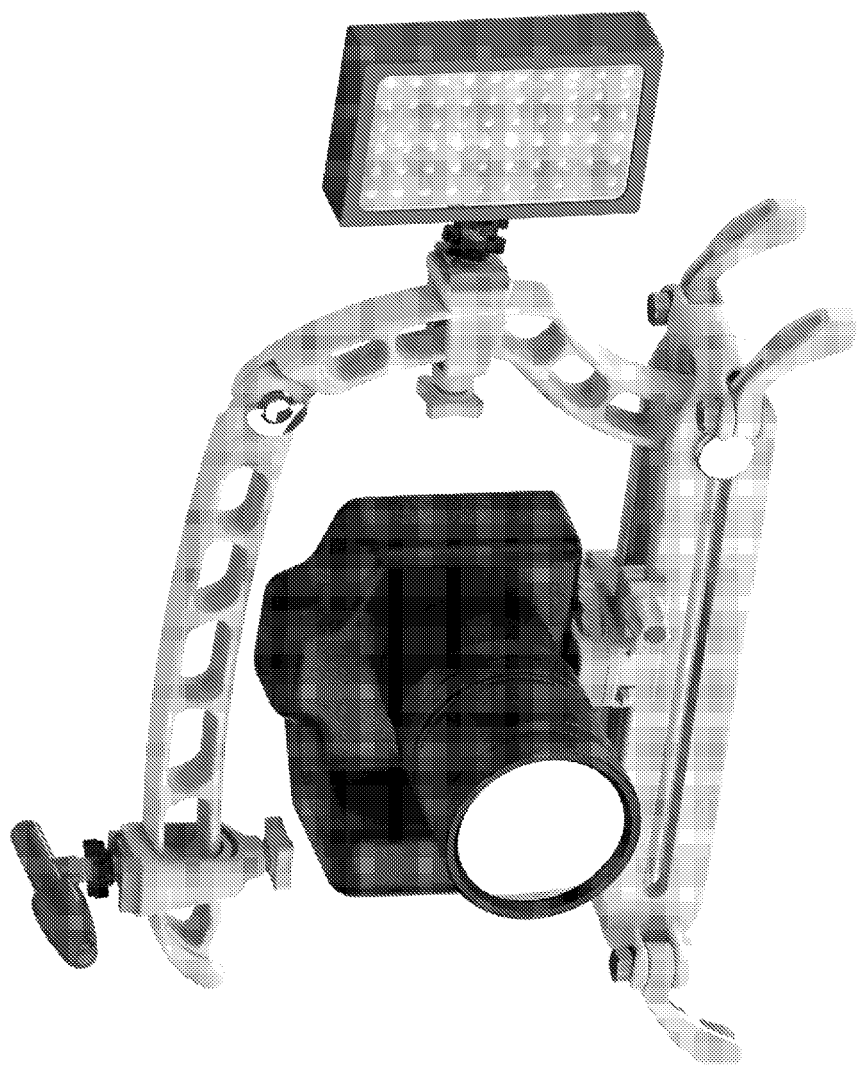
FIG. 11 is a perspective and shaded view of the camera mounting device in a cage assembly with various preferred accessories attached while securing a DSLR camera and a camera accessory.
Figure 12:
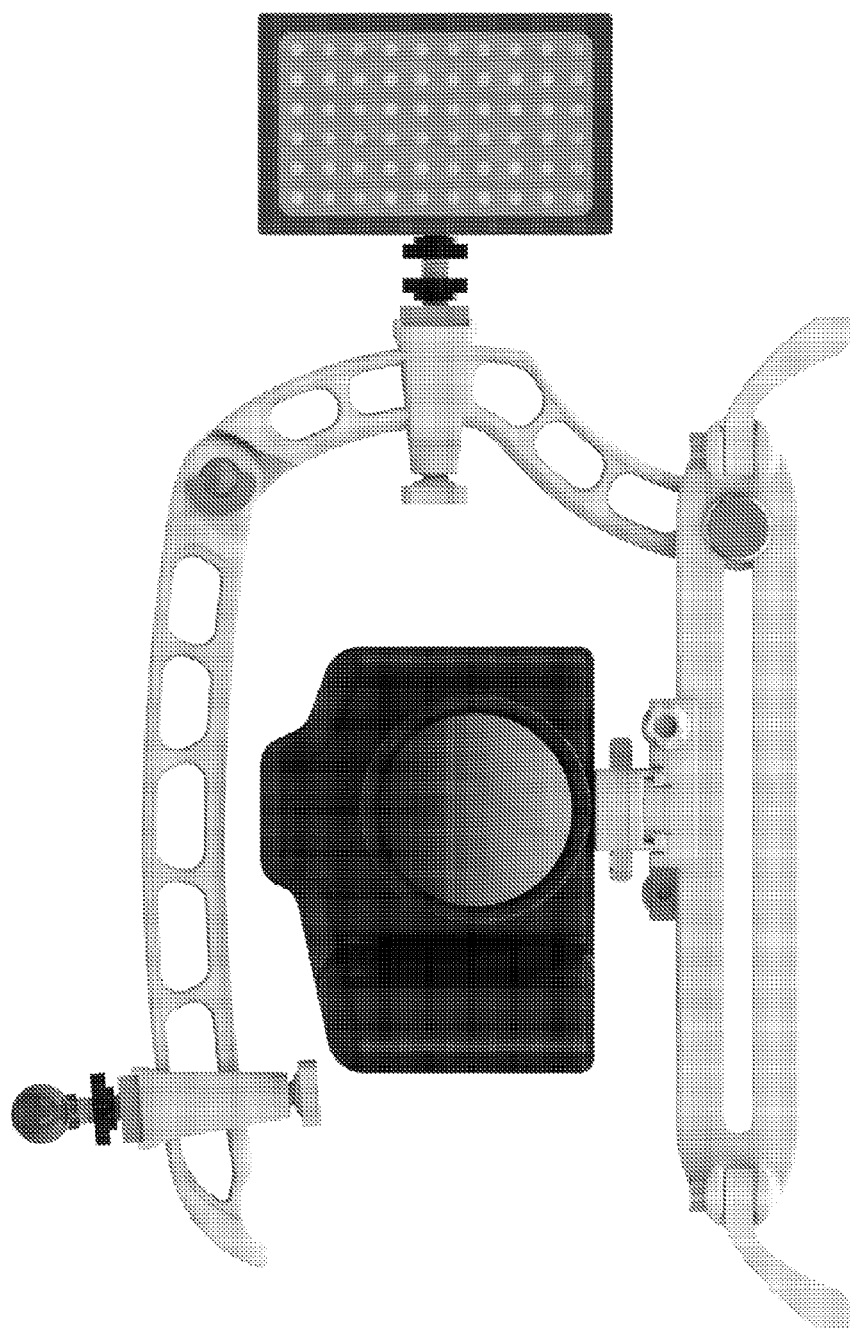
FIG. 12 is a side elevational and shaded view of the camera mounting device in a cage assembly with various preferred accessories attached while securing a DSLR camera and a camera accessory.
Figure 13:
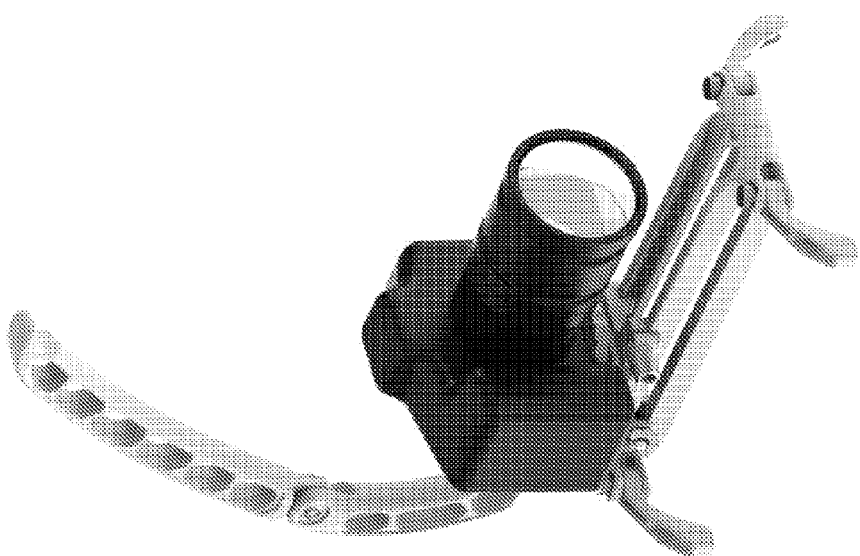
FIG. 13 is a front perspective and shaded view of the camera mounting device in a cage assembly with various preferred accessories attached while securing a DSLR camera.
Figure 14:
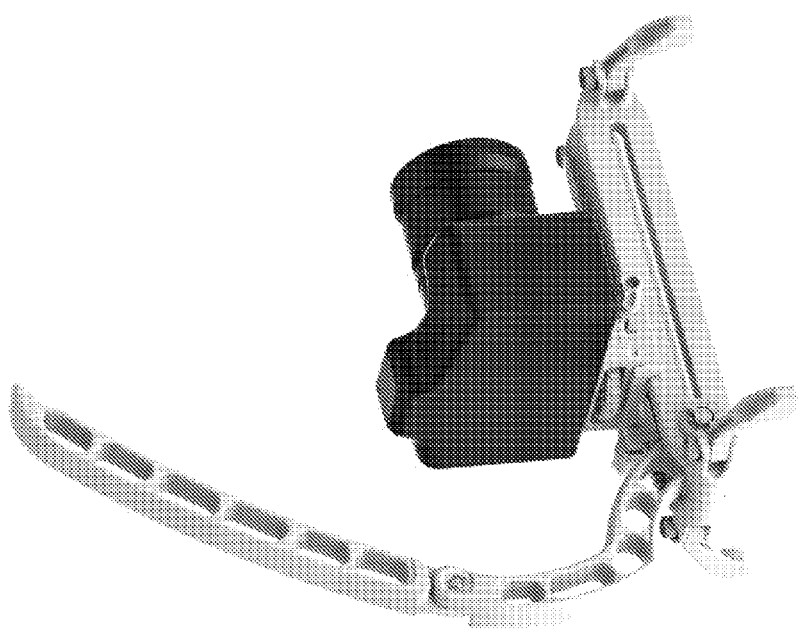
FIG. 14 is a rear perspective and shaded view of the camera mounting device in a cage assembly with various preferred accessories attached while securing a DSLR camera.

In other preferred embodiments, the accessories may comprise a tripod mount, which allows the device to be readily mounted to a tripod without having to modify the position of the camera or other accessories, as shown in FIGS. 8-10.

In other preferred embodiments, the device may be configured as a cage assembly, as shown in FIGS. 11-14.

Figure 15:
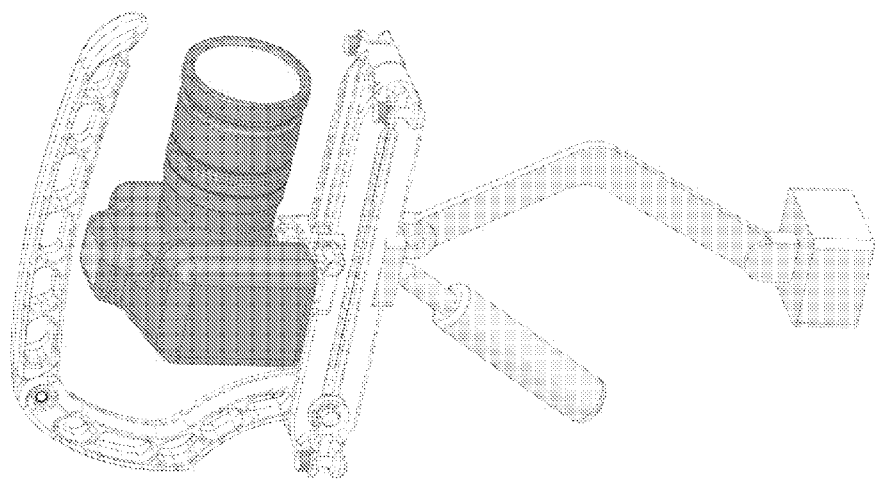
FIG. 15 is a front perspective and shaded view of the camera mounting device in a gimbal stabilizer assembly with various preferred accessories attached while securing a DSLR camera.
Figure 16:
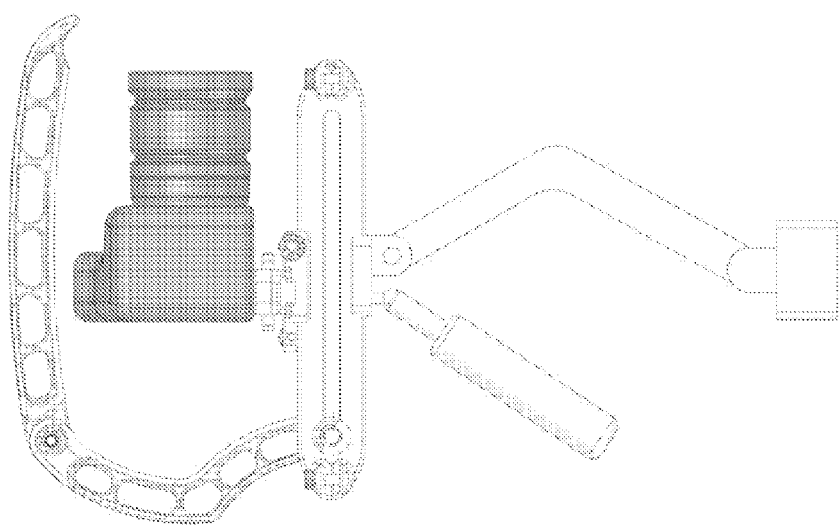
FIG. 16 is a side elevational and shaded view of the camera mounting device in a gimbal stabilizer assembly with various preferred accessories attached while securing a DSLR camera.
Figure 17:
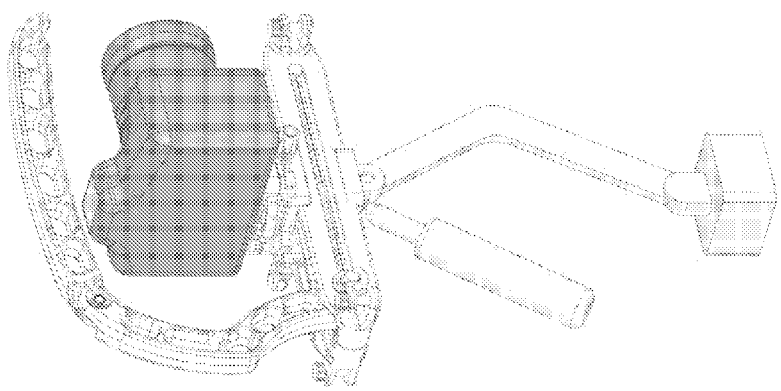
FIG. 17 is a rear perspective and shaded view of the camera mounting device in a gimbal stabilizer assembly with various preferred accessories attached while securing a DSLR camera.

In other preferred embodiments, the accessories may comprise a gimbal stabilization assembly comprising a gimbal mount and counterweights, as shown in FIGS. 15-17. The device thereby acts as a camera stabilizer without modifying the base platform setup. Using the gimbal stabilization assembly the base unit may be converted into a stabilizer using a gimbal and counterweights. This may be achieved by attaching the counterweights via the base unit or by orienting the handle assembly away from the camera, attaching the gimbal to the main handle assembly, and attaching the counterweights to the other end of the main handle assembly.

Figure 18:
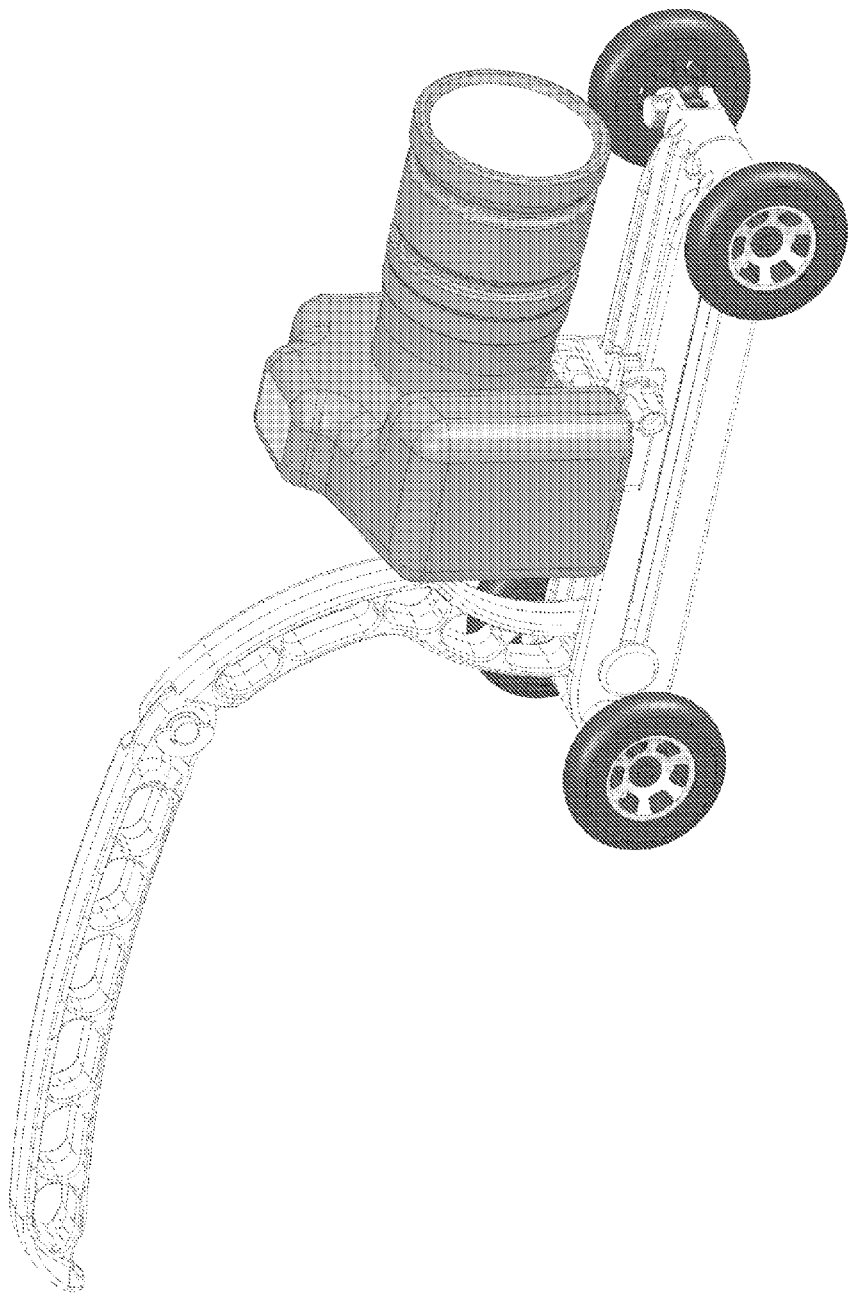
FIG. 18 is a front perspective and shaded view of the camera mounting device in a dolly assembly with various preferred accessories attached while securing a DSLR camera.
Figure 19:
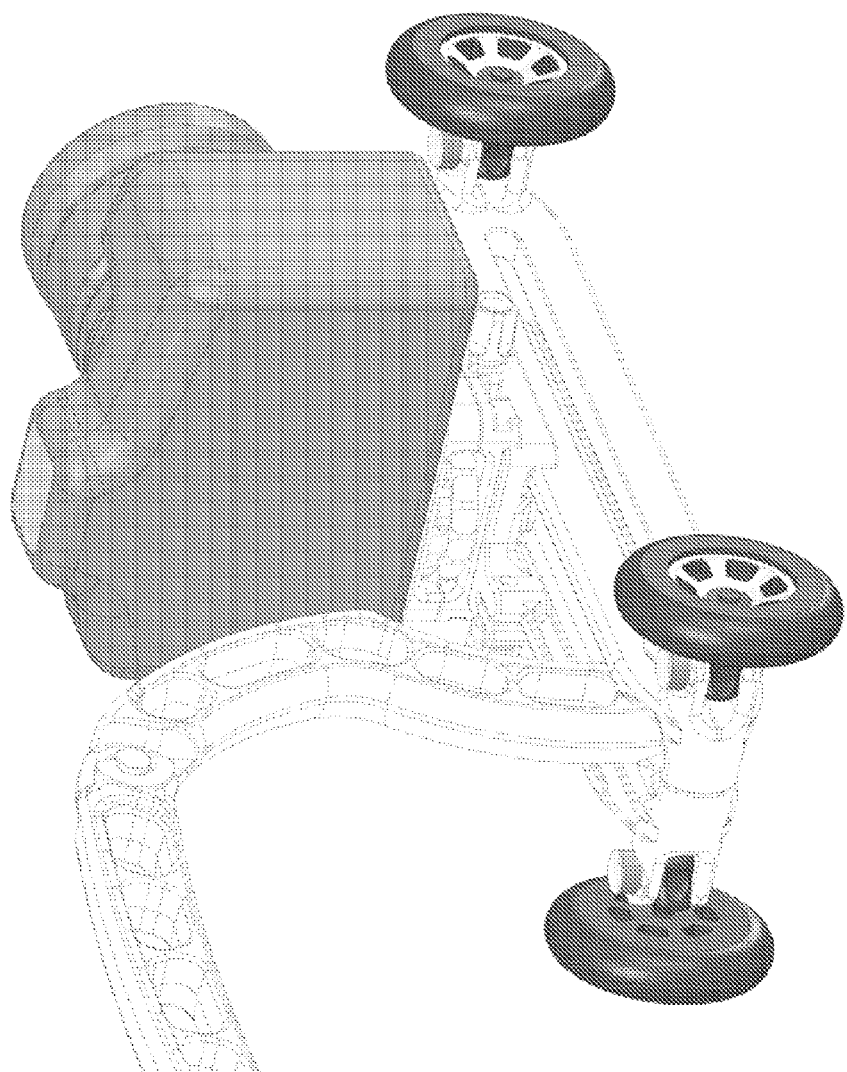
FIG. 19 is a rear perspective and shaded view of the camera mounting device in a dolly assembly with various preferred accessories attached while securing a DSLR camera.
Figure 20:
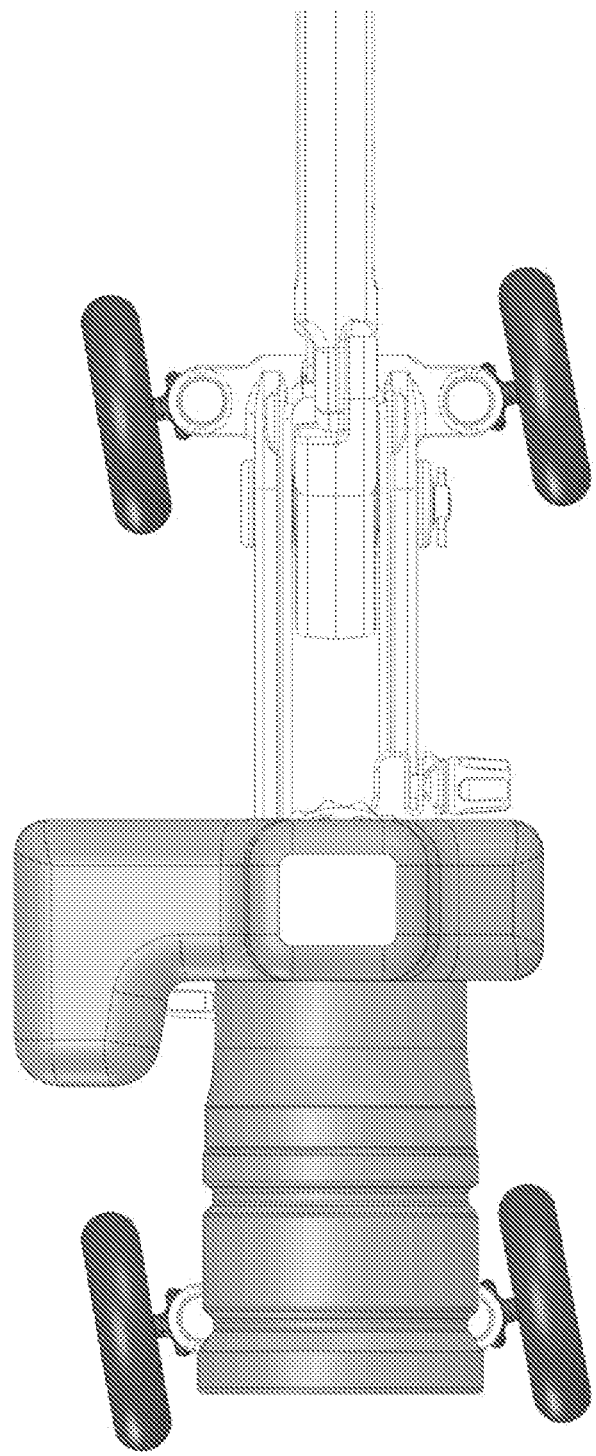
FIG. 20 is a top and shaded view of the camera mounting device in a dolly assembly with various preferred accessories attached while securing a DSLR camera.

In other preferred embodiments, the accessories may comprise a camera dolly assembly. The base unit may be converted into a camera dolly simply by attaching wheels, as shown in FIGS. 18-20.

Figure 21:
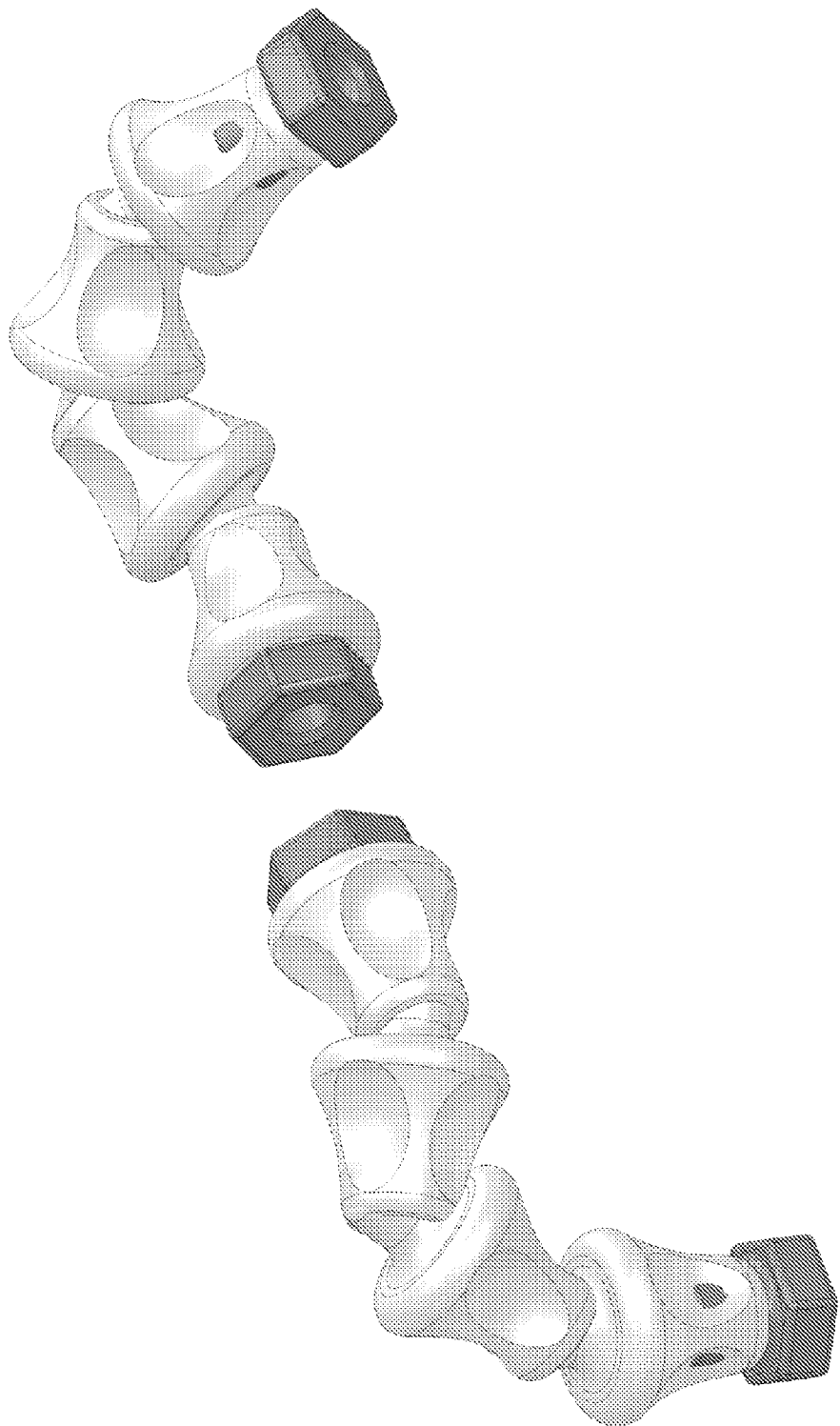
FIG. 21 is an illustration of perspective and shaded views of two interlocking articulating feet accessories.
Figure 22:
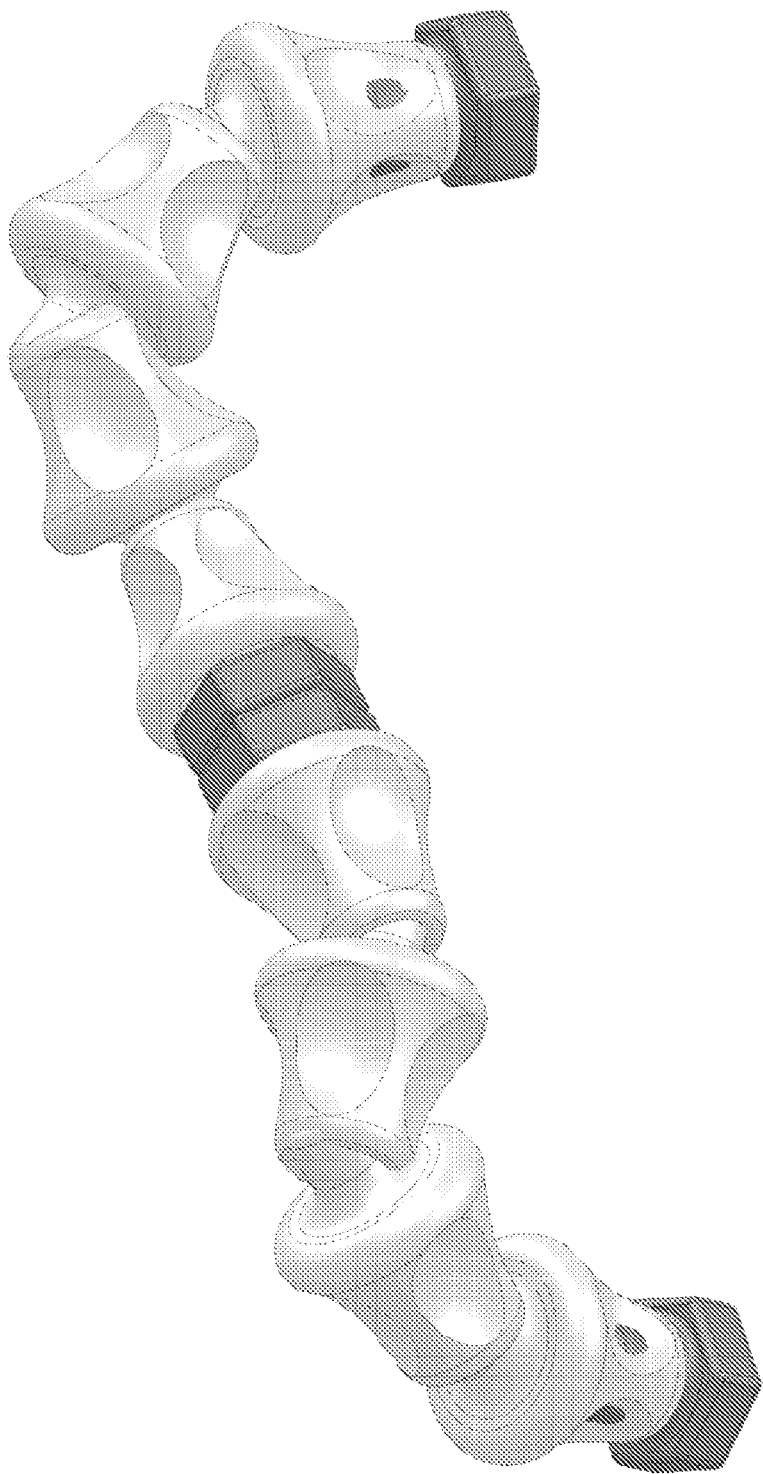
FIG. 22 is an illustration of perspective and shaded view of two interlocking articulating feet accessories.

In other preferred embodiments, the accessories may comprise an interlocking articulating foot accessory, as shown in FIGS. 21-22. This accessory may allow the user to position the device on a surface in a preferred position that is not necessarily horizontal. The ability of the accessory to interlock allows the feet to be extended in length and thereby allows the user to position the device on a wider variety of surfaces. The interlocking articulating foot accessory may also be used as a shoulder support or for hand support.

Figure 23:
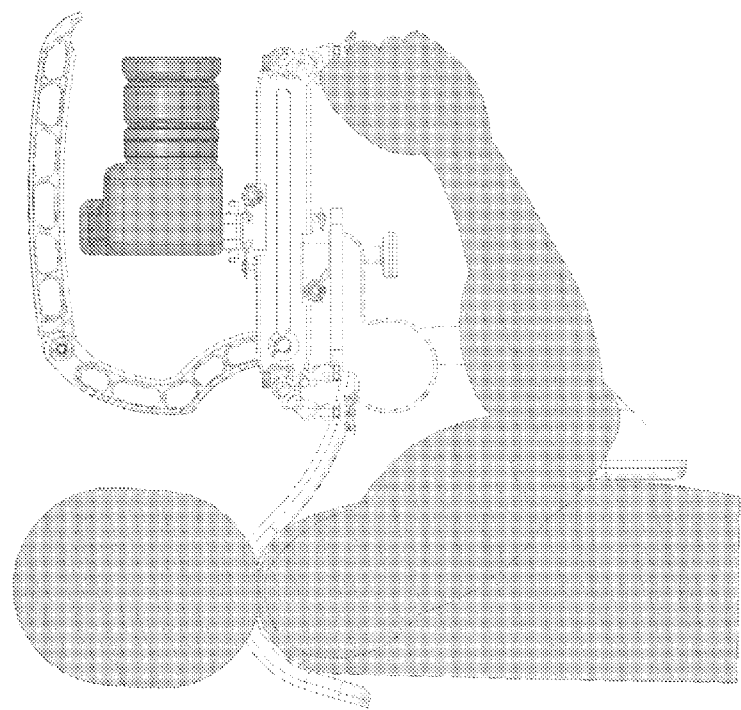
FIG. 23 is a side elevational view of the camera mounting device in a shoulder support assembly with various preferred accessories attached while securing a DSLR camera.
Figure 24:
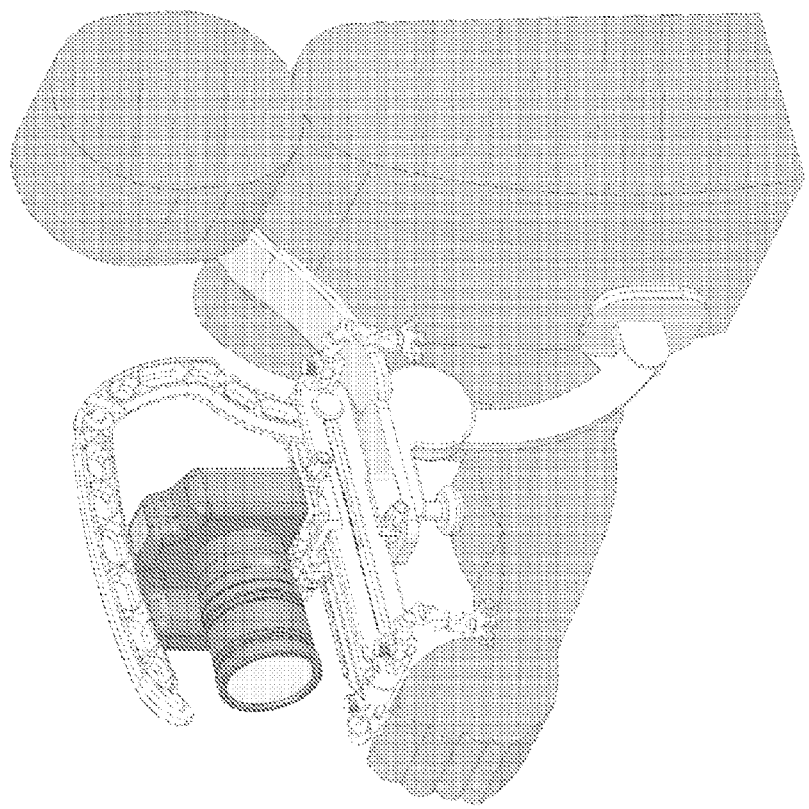
FIG. 24 is a perspective view of the camera mounting device in a shoulder support assembly with various preferred accessories attached while securing a DSLR camera.
Figure 25:
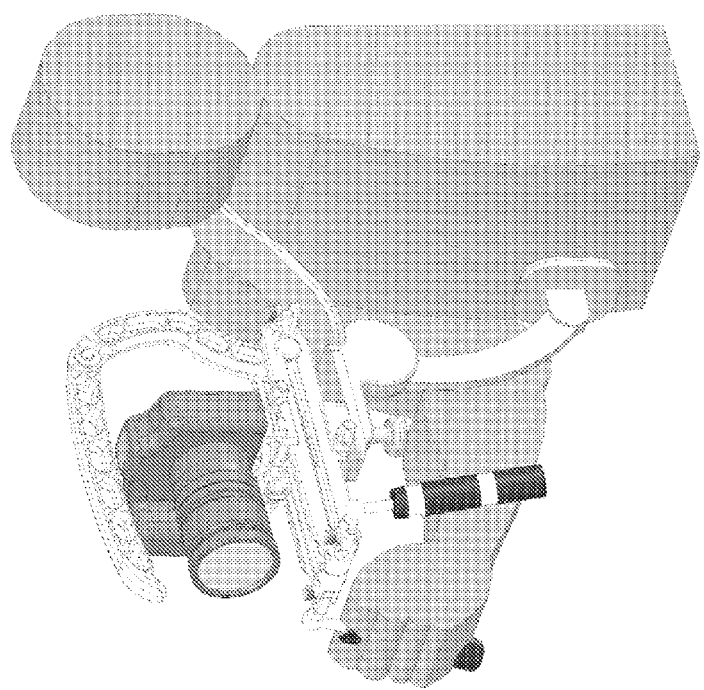
FIG. 25 is a perspective view of the camera mounting device in a shoulder support assembly with various preferred accessories attached while securing a DSLR camera.

In other preferred embodiments, the accessories may comprise a shoulder support, as shown in FIGS. 23-25. The shoulder support allows the device to be supported by the user's shoulder, reducing fatigue and allowing for more comfortable operation of the device.

Figure 26A:
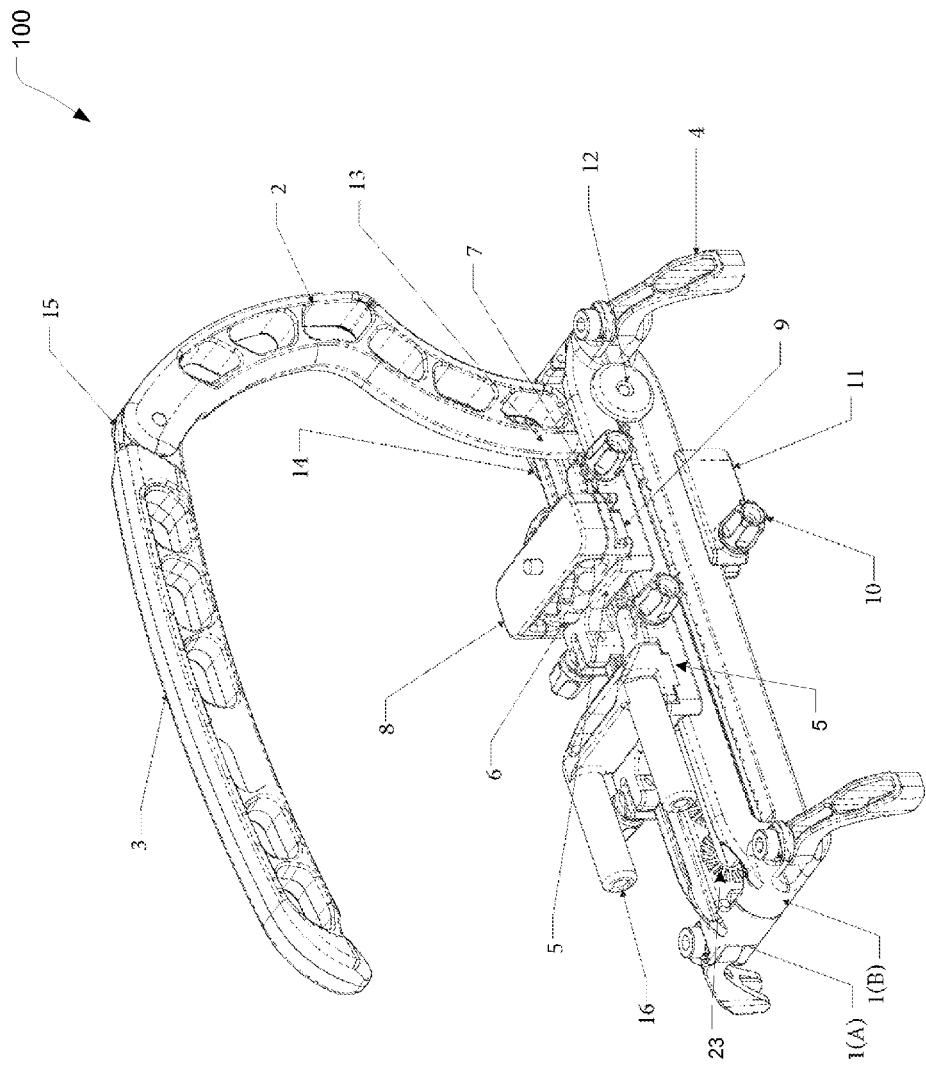
FIG. 26A is a perspective and lined view of the system in accordance with an embodiment of the present invention comprising the camera mounting device and various preferred accessories attached thereon.
Figure 26B:
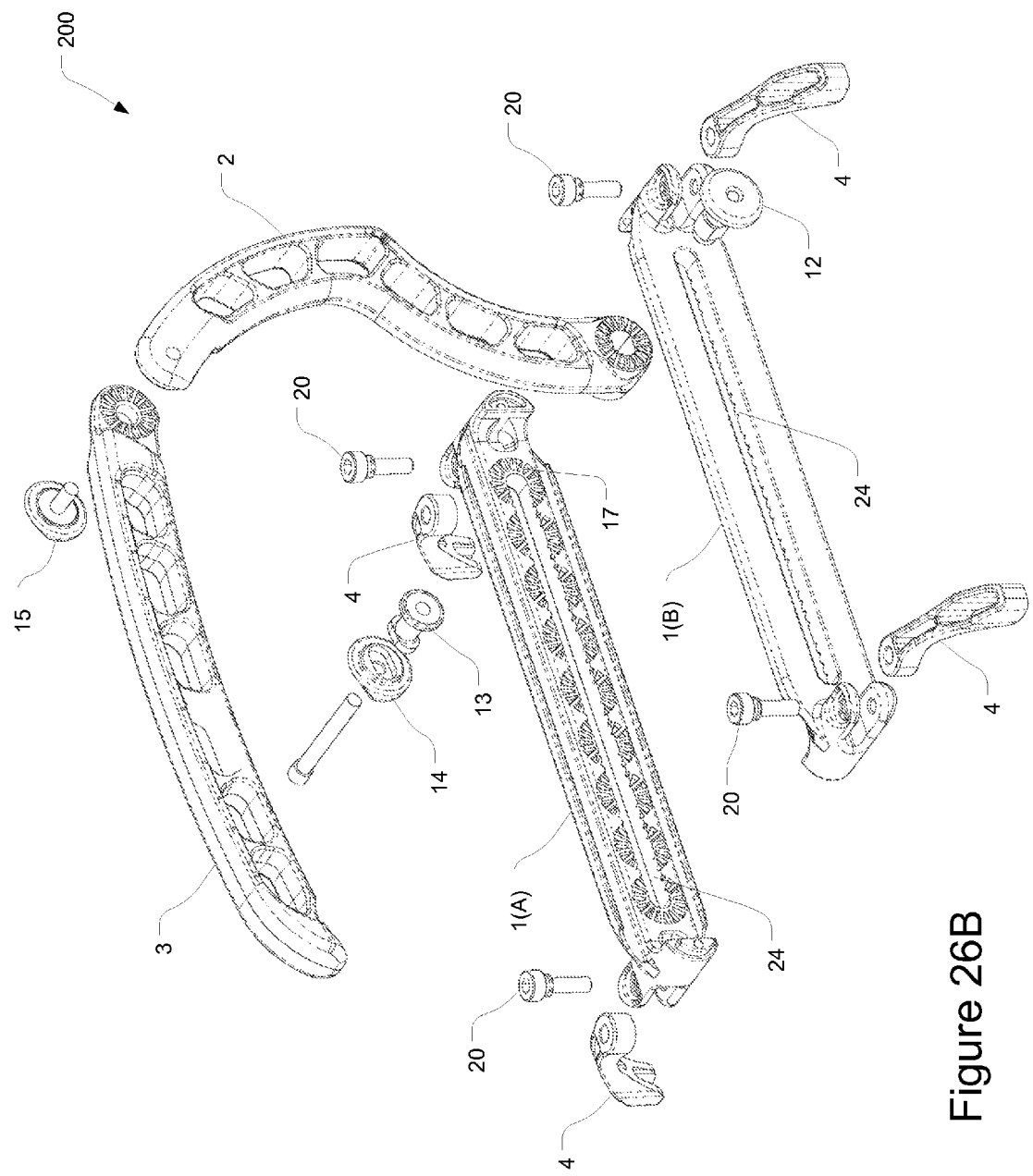
FIG. 26B is an exploded and lined view of the camera mounting device in accordance with an embodiment of the present invention.
Figure 26C:
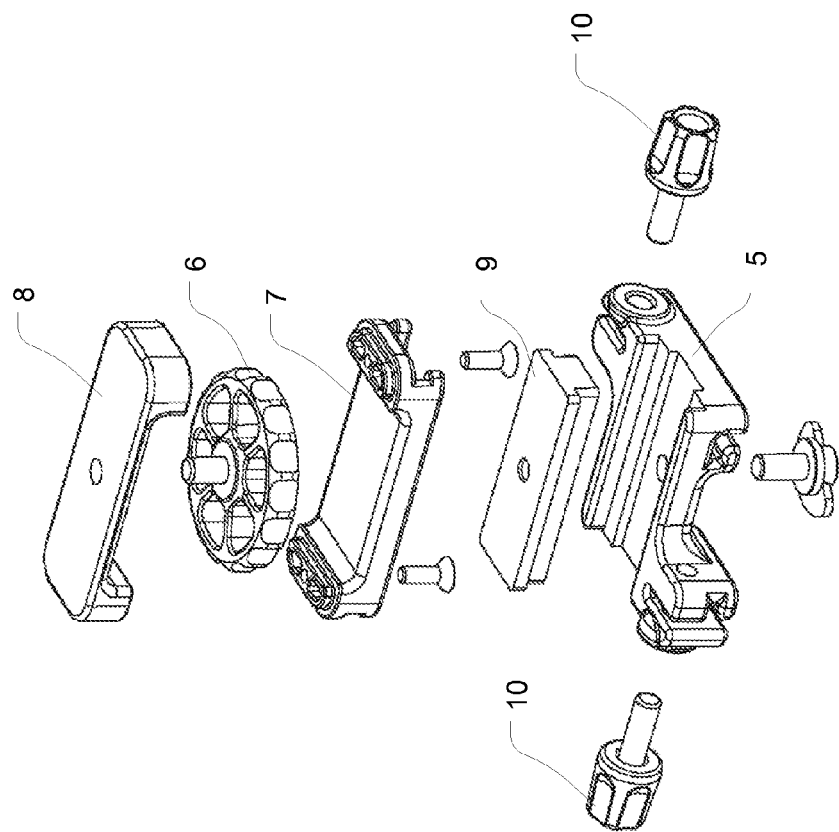
FIG. 26C is an exploded view of the camera mounting accessories.
Figure 26D:
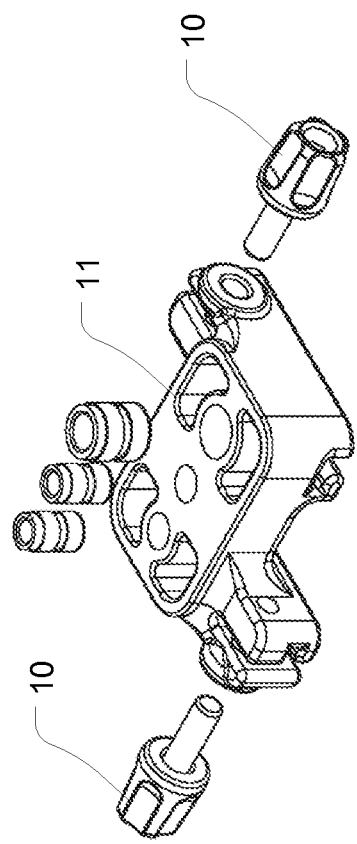
FIG. 26D is an exploded view of the adjustable tripod mount 11 and its mounting components.

FIG. 26A is a perspective view of system 100 of the present invention comprising the camera mounting device 200 and various video accessories. FIG. 26B is an exploded view of the camera mounting device 200 in accordance with an embodiment of the present invention. FIG. 26C is an exploded view of the camera mounting accessories. FIG. 26D is an exploded view of the adjustable tripod mount 11 and its mounting components. As illustrated, the camera mount device 200 comprises a substantially rectangular main base unit 1; a proximal end of a middle handle support 2 slidably coupled to the main base unit 1 using full thread end nut 12; top handle support 3 rotatably coupled to the distal end of the middle handle support 2 using a thin thumb screw base 15; and four base foot support members 4 removably coupled to each corner of main base unit 1 using mounting bolts 20.

As illustrated, the system 100 comprises accessories attached to the camera mounting device 200. Exemplary accessories include an adjustable tripod mount 11 removably attached to the bottom side of the main base unit 1 with a first small thumb screw cap 10 on the left side and a second thumb screw cap 10 on the right side, as illustrated in FIG. 26D. Also, base plate X-Y table 5 is mounted on the topside of the main base unit 1; T-channel clamp 9 coupled to the base plate X-Y table 5; bottom "Y" mount 7 is mounted on T-channel clamp 9; a top "Y" mount 8 coupled on top of the bottom "Y" mount; and a camera mount thumb wheel 6 is mounted through the bottom side of the top "Y" mount 8 for securing a camera, as illustrated in FIG. 26C.

Figure 27:
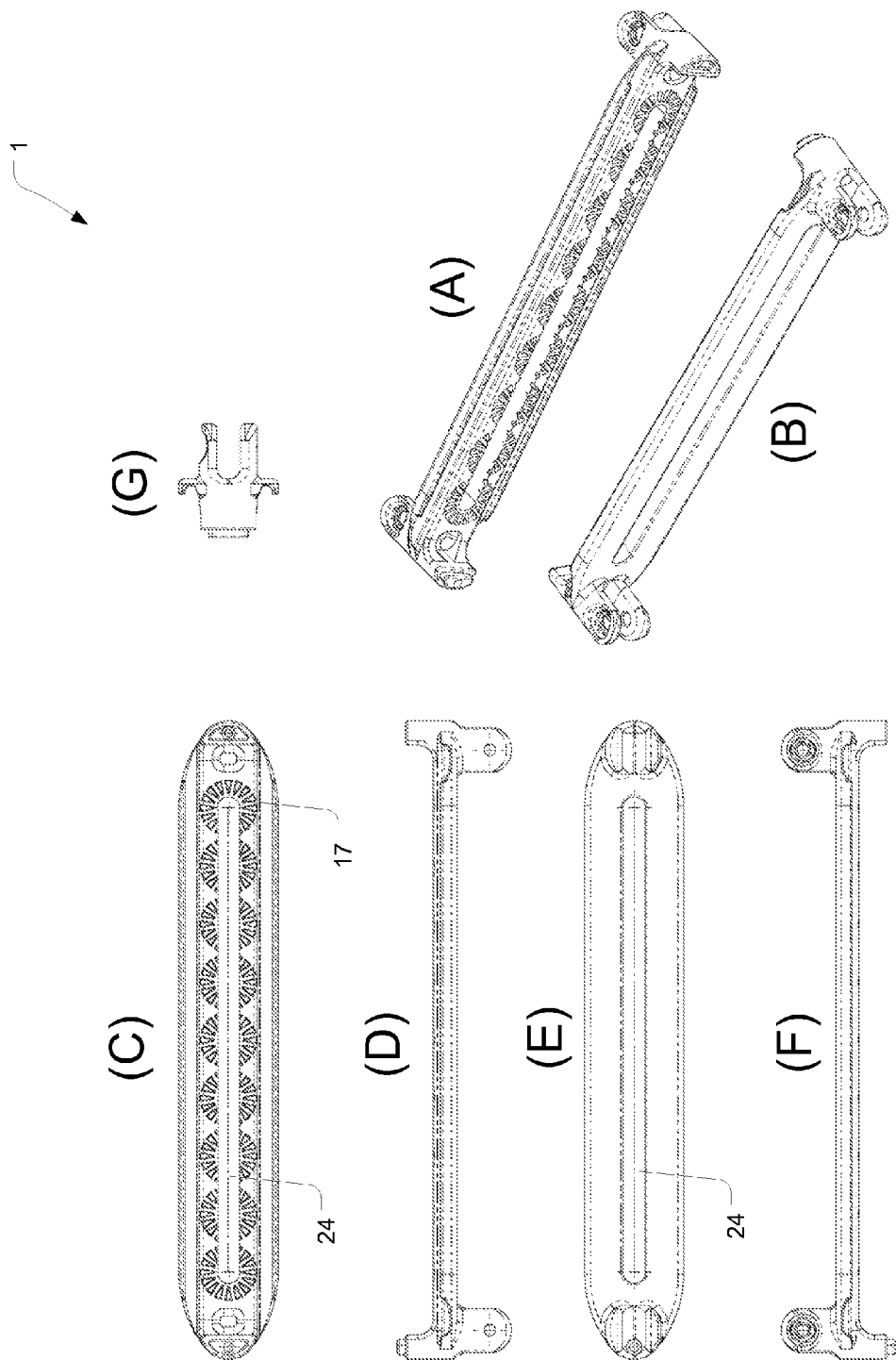
FIG. 27 is an illustration of various views of one part of the main base unit as follows: (A) is a left side perspective view; (B) is a right side perspective view; (C) is a left side elevational view; (D) is a top side view; (E) is a right side elevational view; (F) is bottom side view; and (G) is a front side view.

FIG. 27 is an illustration of various views of one part of the main base unit as follows: (A) is a left side perspective view; (B) is a right side perspective view; (C) is a left side elevational view; (D) is a top side view; (E) is a right side elevational view; (F) is bottom side view; and (G) is a front side view. As illustrated, the main base 1 comprises two identical main base segments 1(A) and 1(B) coupled together to form the main base unit. Each main base segment, e.g. 1(A) or 1(B), includes a plurality of interlocking segments 17, with each interlocking segment 17 configured for interlocking with latch points 21 on middle hand support 2. The main base unit 1 is substantially rectangular and includes a vertical channel 23 running from the proximal end to the distal end. The vertical channel 23 includes one or more interlocking segments 17 on each side wall with each interlocking segment acting as one-half of an interlocking assembly. The main base further includes a horizontal channel 24 through which the middle handle support may be slidably adjusted.

Figure 28:
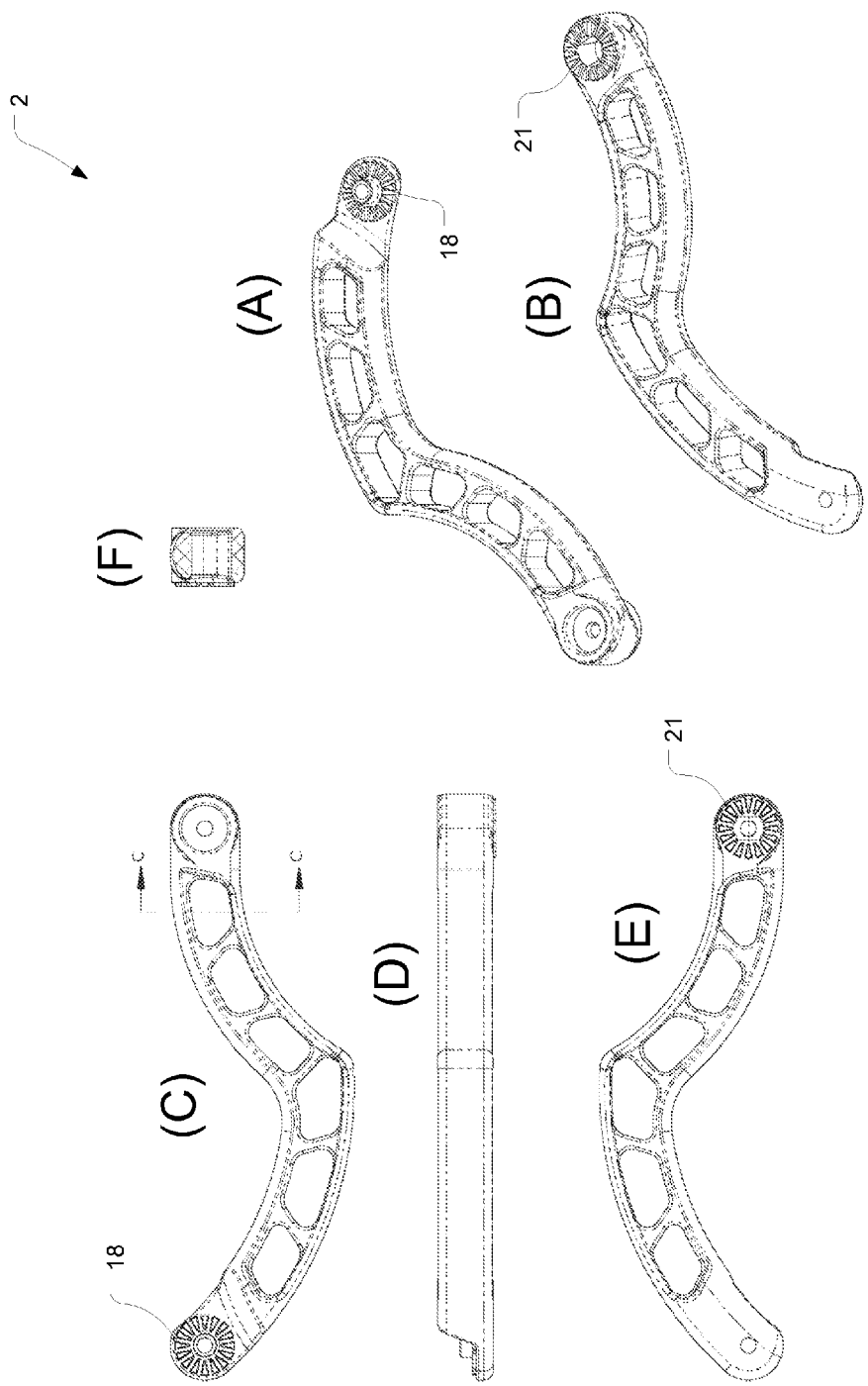
FIG. 28 is an illustration of various views of the middle handle support unit as follows: (A) is a right side perspective view; (B) is a left side perspective view; (C) is a right side elevational view; (D) is a top side view; (E) is a left side elevational view; (F) is a view of cross-section C-C.

FIG. 28 is an illustration of various views of the middle handle support unit as follows: (A) is a right side perspective view; (B) is a left side perspective view; (C) is a right side elevational view; (D) is a top side view; (E) is a left side elevational view; (F) is a view of cross-section C-C. As illustrated, the middle hand support comprises a set of latch points 21 at the proximal end and a set of latch points 18 at its distal end. The latch points 21 at the proximal end is for interlocking with one of the one or more interlocking segments 17 in the channel 23 of the main base unit.

Figure 29:
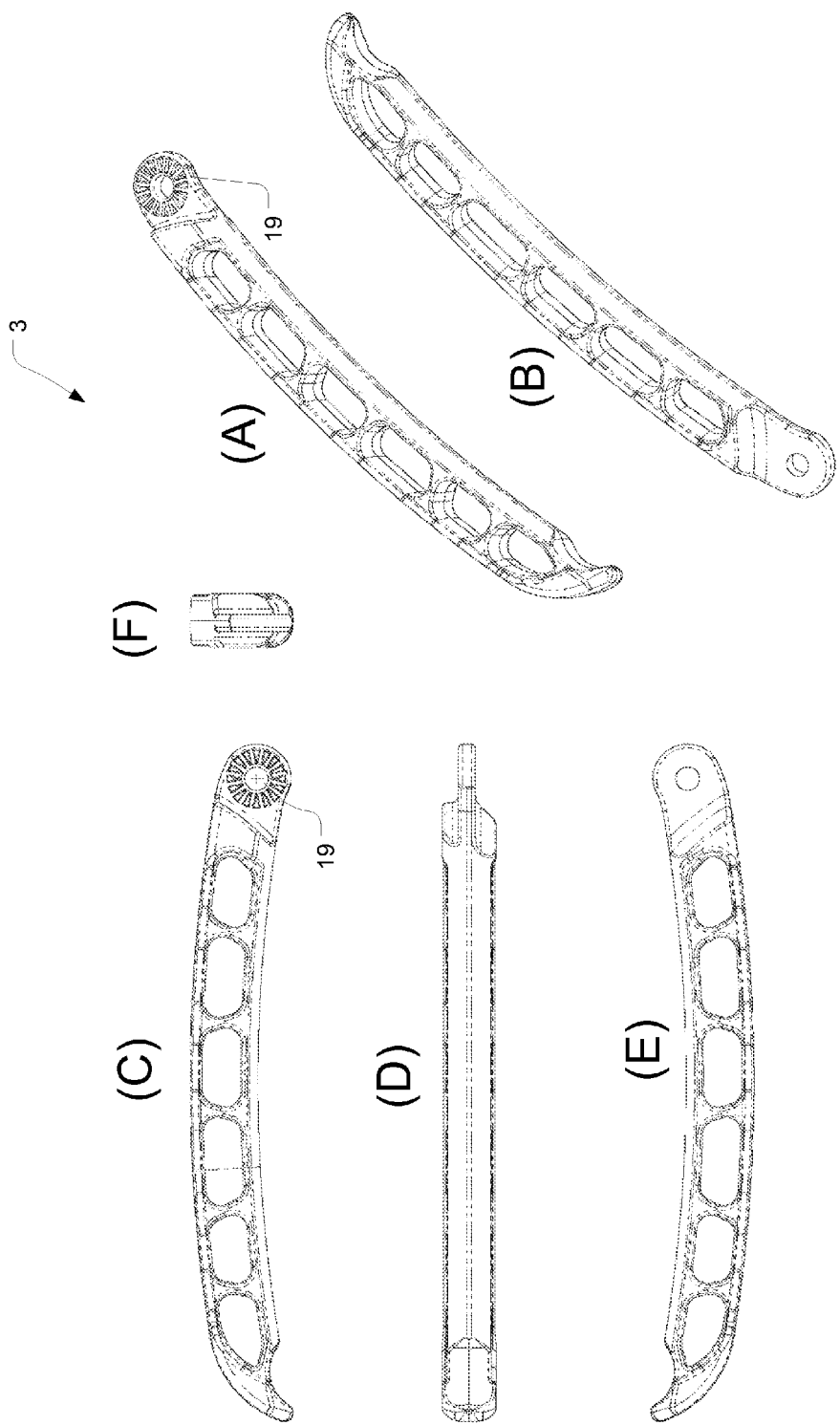
FIG. 29 is an illustration of various views of the top handle support unit as follows: (A) is a left side perspective view; (B) is a right side perspective view; (C) is a left side elevational view; (D) is a top side view; (E) is a right side elevational view; (F) is a front side view.

FIG. 29 is an illustration of various views of the top handle support unit as follows: (A) is a left side perspective view; (B) is a right side perspective view; (C) is a left side elevational view; (D) is a top side view; (E) is a right side elevational view; (F) is a front side view. The top handle support unit includes a set of latch points 19 for interlocking with the set of latch points 18 on the distal end of the middle handle support unit.

Figure 30:
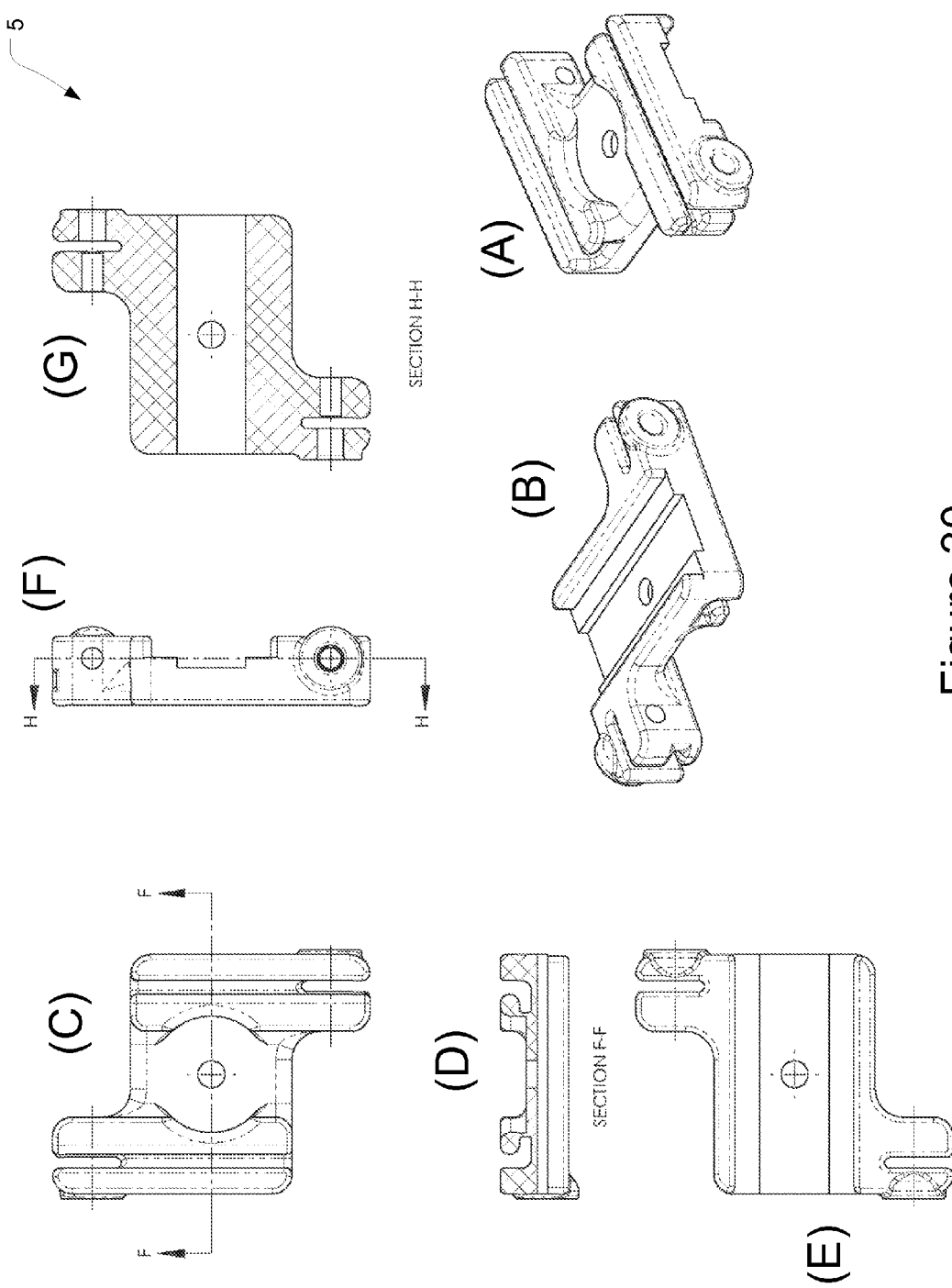
FIG. 30 is an illustration of various views of the base plate X-Y table unit as follows: (A) is a bottom side perspective view; (B) is a top side perspective view; (C) is a bottom elevational view; (D) is a view of cross-section F-F; (E) is a top elevational view; (F) is left side view; and (G) is a view of cross-section H-H.

FIG. 30 is an illustration of various views of the base plate X-Y table unit as follows: (A) is a bottom side perspective view; (B) is a top side perspective view; (C) is a bottom elevational view; (D) is a view of cross-section F-F; (E) is a top elevational view; (F) is left side view; and (G) is a view of cross-section H-H.

Figure 31:
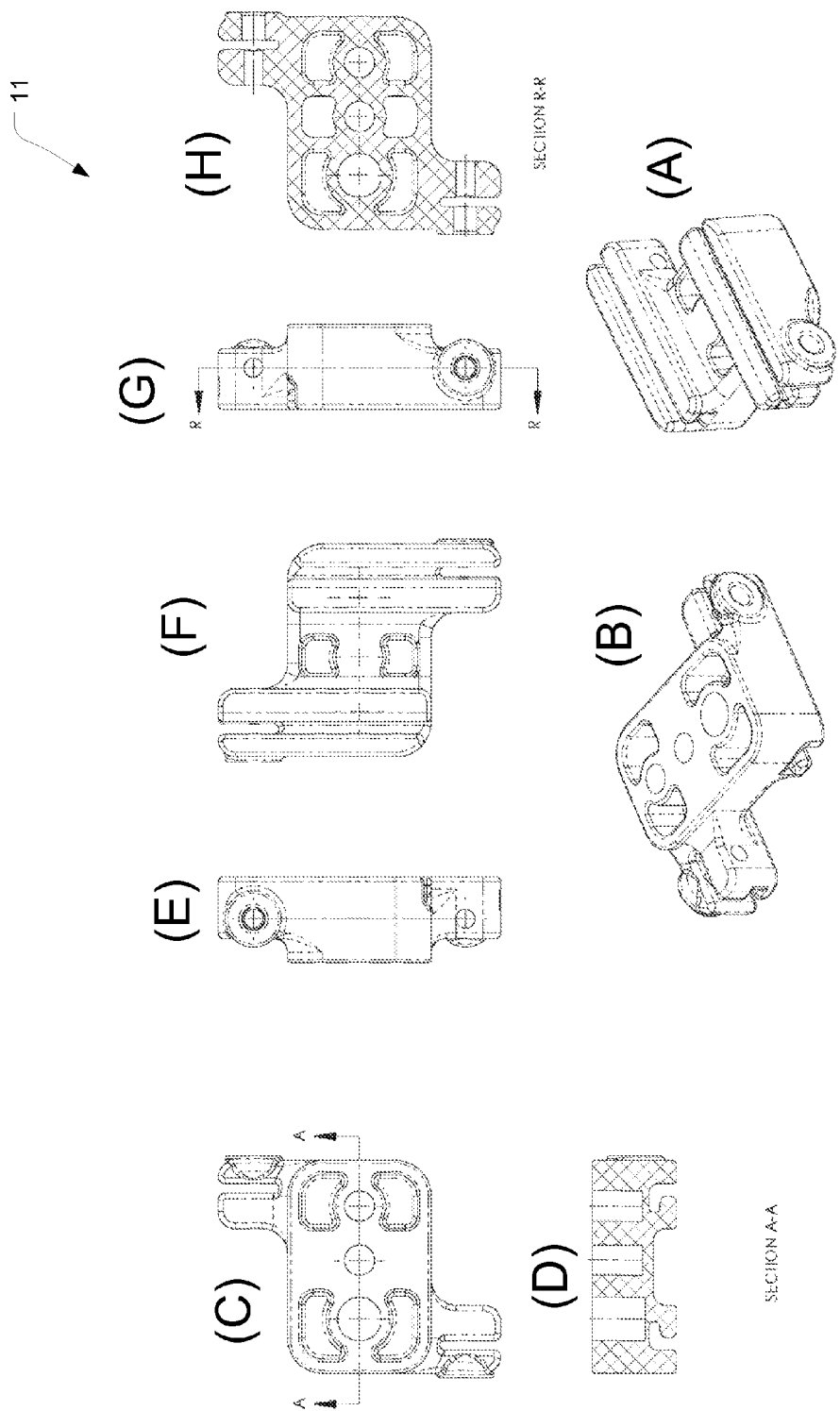
FIG. 31 is an illustration of various views of the small thumb screw cap unit as follows: (A) is a top side perspective view; (B) is a bottom side perspective view; (C) is a bottom side view; (D) is a view of cross-section A-A; (E) is a left side view; (F) is top side view; (G) is right side view; and (H) is a view of cross-section R-R.

FIG. 31 is an illustration of various views of the small thumb screw cap unit as follows: (A) is a top side perspective view; (B) is a bottom side perspective view; (C) is a bottom side view; (D) is a view of cross-section A-A; (E) is a left side view; (F) is top side view; (G) is right side view; and (H) is a view of cross-section R-R.

Figure 32:
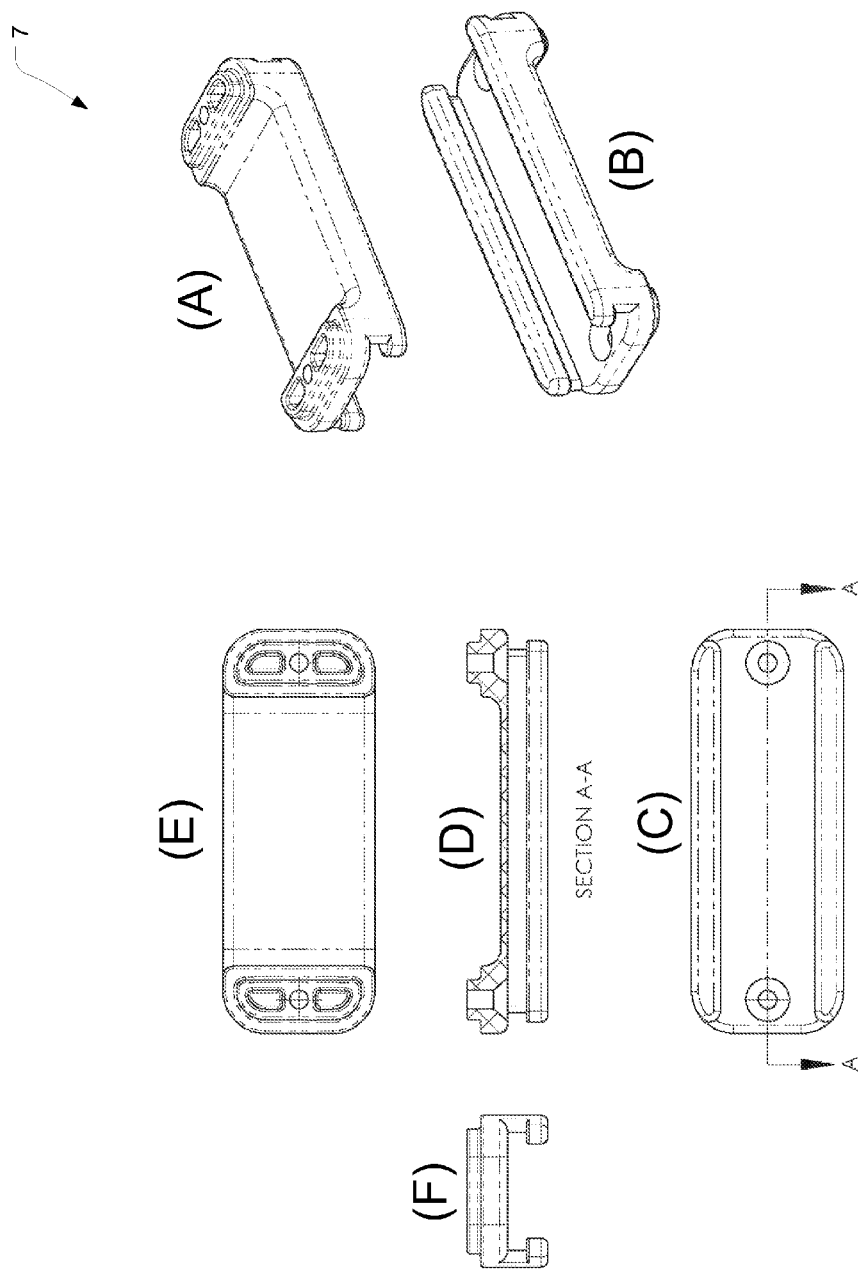
FIG. 32 is an illustration of various views of the bottom Y mount unit as follows: (A) is a top side perspective view; (B) is a bottom side perspective view; (C) is a bottom side elevational view; (D) is a view of cross-section A-A; (E) is a top side elevational view; and (F) is a left or right side elevational view.

FIG. 32 is an illustration of various views of the bottom Y mount unit as follows: (A) is a top side perspective view; (B) is a bottom side perspective view; (C) is a bottom side elevational view; (D) is a view of cross-section A-A; (E) is a top side elevational view; and (F) is a left or right side elevational view.

Figure 33:
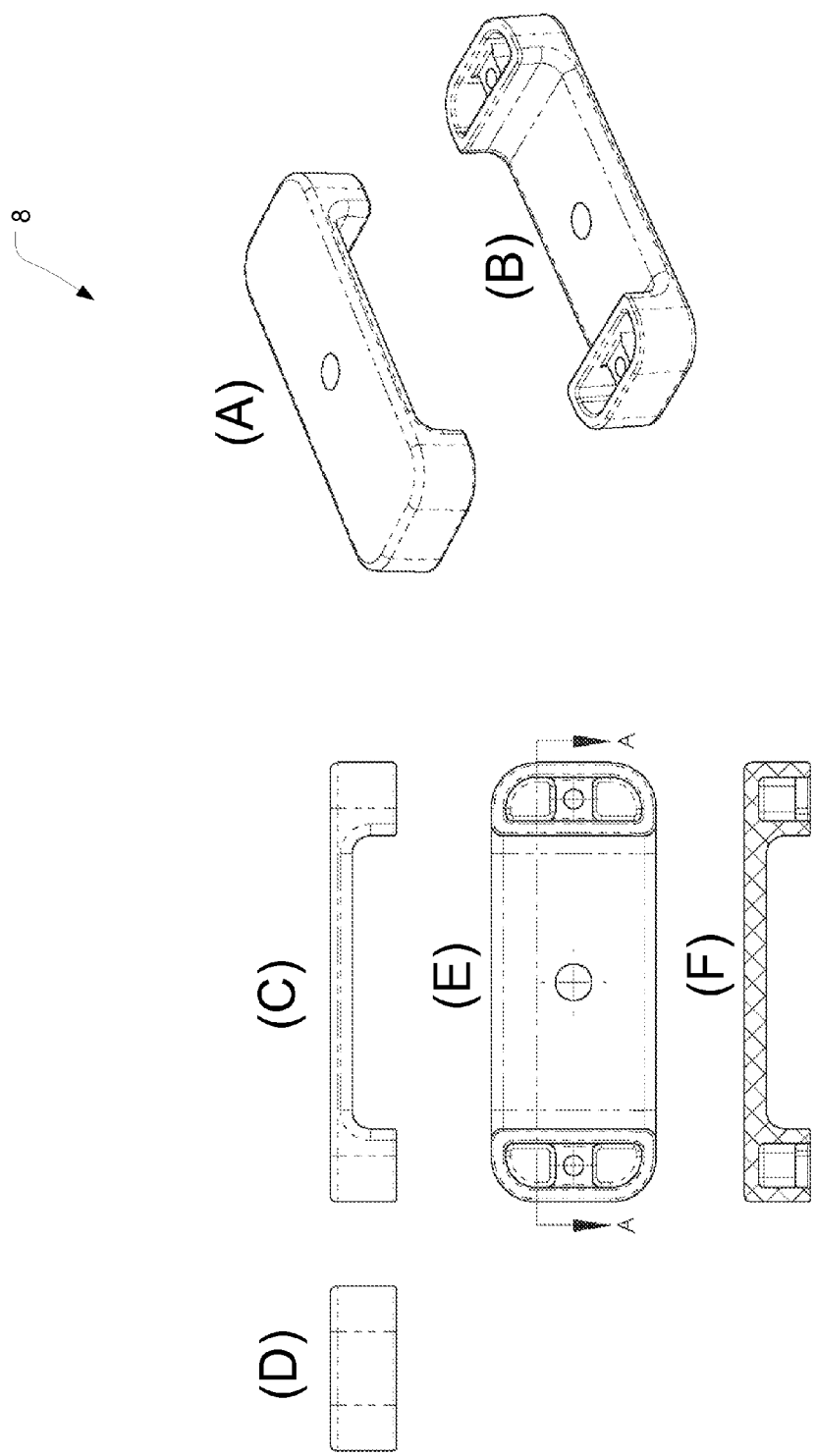
FIG. 33 is an illustration of various views of the top Y mount unit as follows: (A) is a top side perspective view; (B) is a bottom side perspective view; (C) is a front or rear side elevational view; (D) is a left or right side elevational view; (E) is a bottom side elevational view; and (F) is a view of cross-section A-A.

FIG. 33 is an illustration of various views of the top Y mount unit as follows: (A) is a top side perspective view; (B) is a bottom side perspective view; (C) is a front or rear side elevational view; (D) is a left or right side elevational view; (E) is a bottom side elevational view; and (F) is a view of cross-section A-A.

Figure 34:
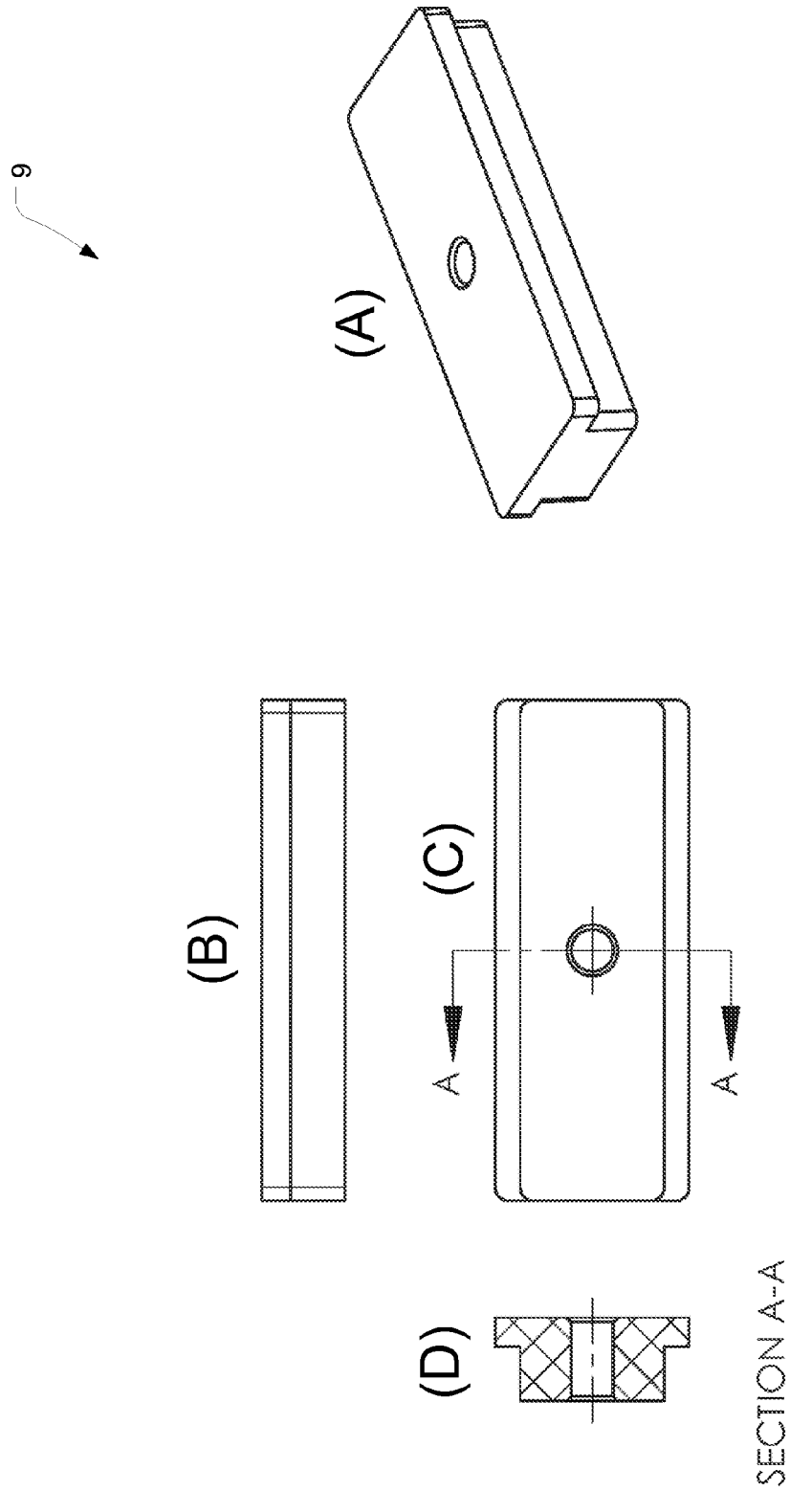
FIG. 34 is an illustration of various views of the T-channel clamp unit as follows: (A) is a top side perspective view; (B) is a front or rear side elevational view; (C) is a bottom side elevational view; and (D) is a view of cross-section A-A.

FIG. 34 is an illustration of various views of the T-channel clamp unit as follows: (A) is a top side perspective view; (B) is a front or rear side elevational view; (C) is a bottom side view; and (D) is a view of cross-section A-A.

Figure 35:
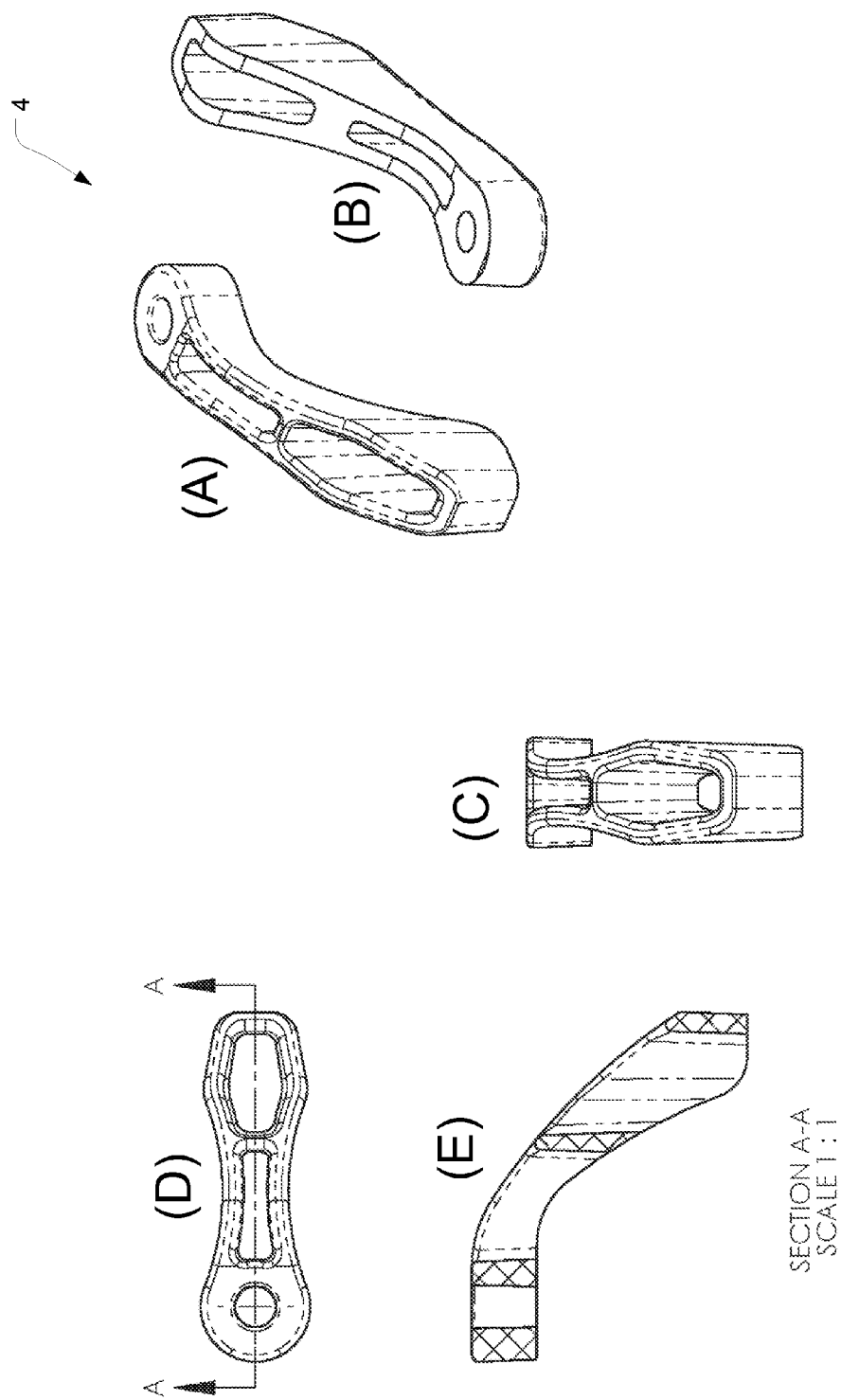
FIG. 35 is an illustration of various views of the base foot support unit as follows: (A) is a top side perspective view; (B) is a bottom side perspective view; (C) is a front view; (D) is a top side view; and (E) is a view of cross-section A-A.

FIG. 35 is an illustration of various views of the base foot support unit as follows: (A) is a top side perspective view; (B) is a bottom side perspective view; (C) is a front view; (D) is a top side view; and (E) is a view of cross-section A-A.

Figure 36:
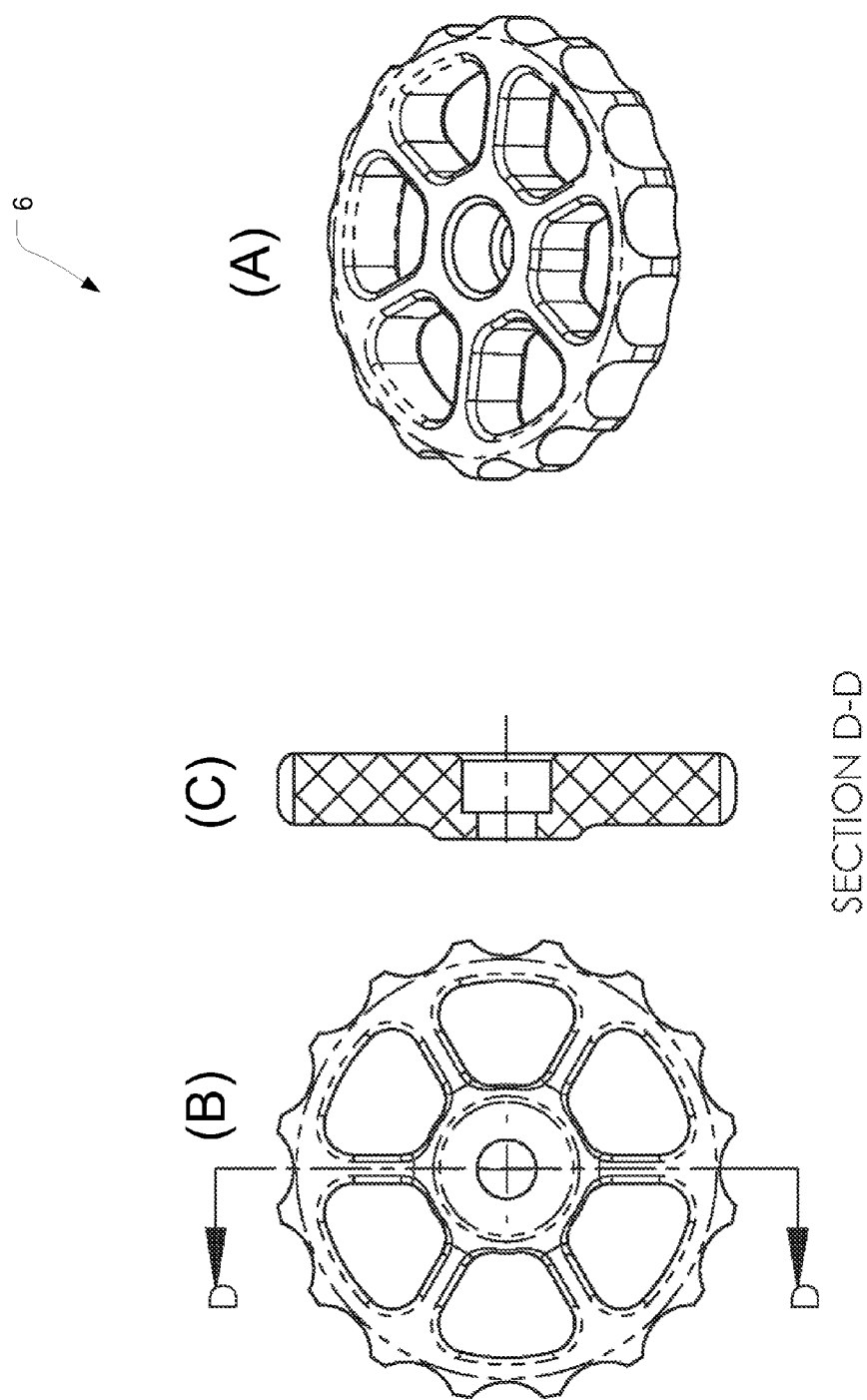
FIG. 36 is an illustration of various views of the camera mount thumb wheel unit as follows: (A) is a top side perspective view; (B) is a bottom side view; and (C) is a view of cross-section D-D.

FIG. 36 is an illustration of various views of the camera mount thumb wheel unit as follows: (A) is a top side perspective view; (B) is a bottom side view; and (C) is a view of cross-section D-D.

Figure 37:
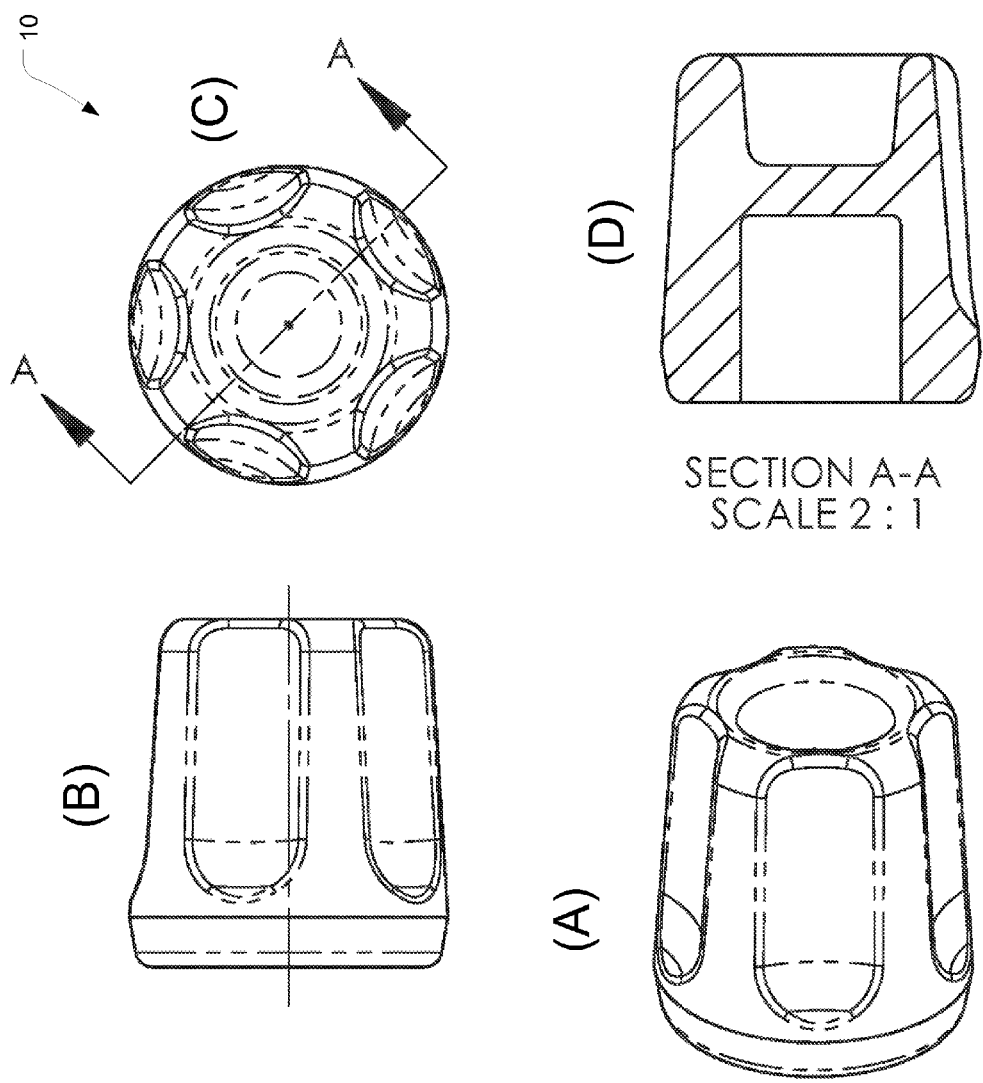
FIG. 37 is an illustration of various views of the small thumb screw cap unit as follows: (A) is a side perspective view; (B) is a side elevational view; (C) is a top side view; and (D) is a view of cross-section A-A.

FIG. 37 is an illustration of various views of the small thumb screw cap unit as follows: (A) is a side perspective view; (B) is a side elevational view; (C) is a top side view; and (D) is a view of cross-section A-A.

The disclosure and examples above are intended to be illustrative and are not intended to limit or otherwise restrict the invention. Numerous variations and modifications will become apparent to those skilled in the art upon full appreciation of the above disclosure.

For example, one skilled in the art will understand that the components and parts of the camera mounting device may be modified by scaling up or scaling down the dimensions of the device without altering the dimensional ratios of these components and parts, and will also understand that the dimensional ratios of the components and parts of the camera mounting device may be altered significantly without affecting its functionality. Examples of such scaling or altering of the dimensional ratios include scaling the device up or down in size by a factor of five or ten, or altering the ratio of the components of the device such as using a larger or smaller main handle assembly compared to the base unit, respectively.

It is intended that the following claims be interpreted to embrace all such variations and modifications.

All references cited herein are expressly incorporated by reference.

What is claimed is:

1. A device for mounting a camera comprising:
a substantially rectangular main base unit with a vertical channel running from a proximal end to a distal end of the main base unit, wherein the vertical channel comprises one or more interlocking segments on at least one side wall of said vertical channel;
a middle handle support unit with its proximal end slidably coupled inside the vertical channel to the distal end of the main base unit, wherein the proximal end of the middle handle support unit includes a first plurality of latch points for interlocking with one of said one or more interlocking segments in said vertical channel;
a top handle support unit rotatably coupled at its proximal end to the distal end of the middle handle support unit, wherein the proximal end of the top handle support unit includes a second plurality of latch points for interlocking with a third plurality of latch points on the distal end of said middle handle support unit; and
a plurality of base foot support members removably coupled to the main base unit.

2. The device for mounting a camera of claim 1, further comprising an adjustable tripod mount removably attached to the bottom side of the main base unit.

3. The device for mounting a camera of claim 1, further comprising a base plate table removably attached to the topside of the main base unit for mounting camera accessories.

4. The device for mounting a camera of claim 3, further comprising: a T-channel clamp coupled with the base plate table; a bottom "Y" mount mounted on the T-channel clamp; a top "Y" mount coupled to the bottom "Y" mount; and a camera mount thumb wheel mounted through the bottom side of the top "Y" mount for securing a camera or camera accessory.

5. The device for mounting a camera of claim 1, wherein the main base unit is configured for mounting one or more camera accessories selected from the group consisting of a main handle assembly, adjustable feet, a tripod mount, a gimbal stabilization assembly, a dolly assembly, interlocking articulating feet, and a shoulder support assembly.

6. A device for mounting a camera comprising:
a substantially rectangular main base unit with a vertical channel running from a proximal end to a distal end of the main base unit, wherein the vertical channel comprises one or more interlocking segments on at least one side wall of said vertical channel;
a middle handle support unit with its proximal end slidably coupled inside the vertical channel to the distal end of the main base unit, wherein the proximal end of the middle handle support unit includes a first plurality of latch points for interlocking with one of said one or more interlocking segments in said vertical channel; and
a top handle support unit rotatably coupled at its proximal end to the distal end of the middle handle support, wherein the proximal end of the top handle support unit includes a second plurality of latch points for interlocking with a third plurality of latch points on the distal end of said middle handle support unit.

7. The device for mounting a camera of claim 6, further comprising an adjustable tripod mount removably attached to the bottom side of the main base unit.

8. The device for mounting a camera of claim 6, further comprising a base plate table removably attached to the topside of the main base unit for mounting camera accessories.

9. The device for mounting a camera of claim 8, further comprising: a T-channel clamp coupled with the base plate table; a bottom "Y" mount mounted on the T-channel clamp; a top "Y" mount coupled to the bottom "Y" mount; and a camera mount thumb wheel mounted through the bottom side of the top "Y" mount for securing a camera or camera accessory.

10. The device for mounting a camera of claim 6, wherein the main base unit is configured for mounting one or more camera accessories selected from the group consisting of a main handle assembly, adjustable feet, a tripod mount, a gimbal stabilization assembly, a dolly assembly, interlocking articulating feet, and a shoulder support assembly.

11. A device for mounting a camera comprising:
a substantially rectangular main base unit;
a middle handle support unit with its proximal end slidably coupled to the distal end of the main base unit, wherein the proximal end of the middle handle support is slidable from the distal end to the proximal of the main base unit;
a top handle support unit rotatably coupled to the distal end of the middle handle support unit; and
a plurality of base foot support members removably coupled to the main base unit.

12. The device for mounting a camera of claim 11, further comprising an adjustable tripod mount removably attached to the bottom side of the main base unit.

13. The device for mounting a camera of claim 11, further comprising a base plate table removably attached to the topside of the main base unit for mounting camera accessories.

14. The device for mounting a camera of claim 13, further comprising: a T-channel clamp coupled with the base plate table; a bottom "Y" mount mounted on the T-channel clamp; a top "Y" mount coupled to the bottom "Y" mount; and a camera mount thumb wheel mounted through the bottom side of the top "Y" mount for securing a camera or camera accessory.

15. The device for mounting a camera of claim 11, wherein the main base unit comprises a vertical channel running from its proximal end to its distal end, wherein the vertical channel comprises one or more interlocking segments on at least one side wall of said vertical channel.

16. The device for mounting a camera of claim 15, wherein the proximal end of the middle handle support unit includes a first plurality of latch points for interlocking with one of said one or more interlocking segments in said vertical channel.

17. The device for mounting a camera of claim 11, wherein the distal end of the middle handle support unit includes a third plurality of latch points.

18. The device for mounting a camera of claim 17, wherein the proximal end of the top handle support unit includes a second plurality of latch points for interlocking with the third plurality of latch points on the distal end of said middle handle support unit.

19. The device for mounting a camera of claim 11, wherein the main base unit is configured for mounting one or more camera accessories.

20. The device for mounting a camera of claim 11, wherein the camera accessories comprise one or more accessories selected from the group consisting of a main handle assembly, adjustable feet, a tripod mount, a gimbal stabilization assembly, a dolly assembly, interlocking articulating feet, and a shoulder support assembly.

* * * * *